United States Patent
Narang et al.

(10) Patent No.: US 8,725,573 B1
(45) Date of Patent: May 13, 2014

(54) METHOD AND SYSTEM FOR CREATING AND MAINTAINING A VIRTUAL LIBRARY

(75) Inventors: Varun Narang, Issaquah, WA (US); Udi Manber, Palo Alto, CA (US); Hilliard B Siegel, Seattle, WA (US); Jeffrey P Bezos, Greater Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 2298 days.

(21) Appl. No.: 11/127,688

(22) Filed: May 11, 2005

Related U.S. Application Data

(63) Continuation-in-part of application No. 10/920,149, filed on Aug. 17, 2004, now abandoned, which is a continuation-in-part of application No. 10/864,291, filed on Jun. 9, 2004.

(51) Int. Cl.
G06Q 30/00 (2012.01)

(52) U.S. Cl.
USPC ............................................. 705/15; 705/26

(58) Field of Classification Search
USPC ...................................................... 705/15–28
See application file for complete search history.

(56) References Cited

U.S. PATENT DOCUMENTS

| | | | | |
|---|---|---|---|---|
| 5,963,134 | A * | 10/1999 | Bowers et al. | 340/572.1 |
| 5,970,471 | A * | 10/1999 | Hill | 705/26.8 |
| 6,154,771 | A * | 11/2000 | Rangan et al. | 709/217 |
| 6,273,338 | B1 | 8/2001 | White | |
| 6,541,100 | B1 | 4/2003 | Williams et al. | |
| 6,566,024 | B1 | 5/2003 | Bourdelais et al. | |
| 6,678,619 | B2 * | 1/2004 | Lobanov et al. | 506/13 |
| 6,850,252 | B1 * | 2/2005 | Hoffberg | 715/716 |
| 7,251,647 | B2 * | 7/2007 | Hoblit | 707/609 |
| 7,416,524 | B1 * | 8/2008 | Lobanov et al. | 506/8 |
| 2002/0124009 | A1 * | 9/2002 | Hoblit | 707/104.1 |
| 2002/0194051 | A1 * | 12/2002 | Hall et al. | 705/10 |
| 2003/0004816 | A1 * | 1/2003 | Byers et al. | 705/26 |
| 2003/0009392 | A1 * | 1/2003 | Perkowski | 705/26 |
| 2003/0088582 | A1 * | 5/2003 | Pflug | 707/104.1 |
| 2003/0154141 | A1 * | 8/2003 | Capazario et al. | 705/27 |
| 2003/0195824 | A1 * | 10/2003 | Duffy et al. | 705/26 |
| 2004/0181467 | A1 * | 9/2004 | Raiyani et al. | 705/28 |
| 2005/0086117 | A1 * | 4/2005 | Kanisawa et al. | 705/26 |

OTHER PUBLICATIONS

Feder, A., "A Look at Delicious Library 3.0 (images)," *Think Secret*, Aug. 3, 2004, <http://thinksecret.com/news/deliciouslibrary.html> [retrieved Jan. 19, 2005].

(Continued)

*Primary Examiner* — Garcia Ade
(74) *Attorney, Agent, or Firm* — Knobbe, Martens, Olson and Bear, LLP

(57) ABSTRACT

A system and method for creating and maintaining a virtual library is provided. A virtual library includes one or more photographic images of the user's physical library, and an inventory of the products revealed in those images. The virtual librarian facilitates uploading the images, generating an inventory from those images, and locating products in the physical library with reference to the images. The virtual librarian optionally provides the user with an appraisal of the value of their physical library, and advice regarding how to organize the library and whether to make certain acquisitions to complement the existing library.

76 Claims, 18 Drawing Sheets

(56) References Cited

OTHER PUBLICATIONS

"A Look at Delicious Library 3.0 Overview," *Think Secret*, Aug. 3, 2004, <http://thinksecret.com/archives/images/deliciouslibrary/Overview.html> [retrieved Jan. 19, 2005].

"Visual Inventory Control," *Dynamic Control Software*, <http://dynamiccontrolsoftware.com>, publicly available prior to Jun. 9, 2004, [retrieved Jan. 19, 2005].

"Book Collector Book Inventory Software," Collectorz.com Book Collector, n.d., <http://www.collectorz.com/booldbook_inventory.php?from=google&keyword=book_inv . . . > [retrieved Dec. 31, 2003].

"Book Collector Features," Collectorz.com Book Collector, n.d., <http://www.collectorz.com/book/features.php> [retrieved Dec. 31, 2003].

"Edge, Junction, and Corner Detection Using Color Distributions," *ACM Portal*, ACM, Inc. © 2004, <http://portal.acm.org/citation.cfm?id=505477&dl=ACM&coll=portal> [retrieved Feb. 24, 2004].

"Technology and Services," Advanced Records Management Services, Inc., n.d., <http://www.armsrecords.com/pg4.html> [retrieved Dec. 31, 2003].

"Visual Inventory Control Software," Dynamic Control Software, n.d. <http://www.dynamiccontrolsoftware.com> [retrieved Dec. 31, 2003].

\* cited by examiner

METHOD AND SYSTEM FOR CREATING AND MAINTAINING A VIRTUAL LIBRARY

CROSS-REFERENCE TO RELATED APPLICATION

The application is a continuation-in-part of prior application Ser. No. 10/920,149, filed Aug. 17, 2004, which is, in turn, a continuation-in-part of prior application Ser. No. 10/864,291, filed Jun. 9, 2004, priority from the filing dates of both of which is hereby claimed under 35 U.S.C. §120.

FIELD OF THE INVENTION

The present invention is directed to methods and systems for creating and maintaining a virtual library of products that represents a physical library of products.

BACKGROUND OF THE INVENTION

The information age has produced an explosion of media for people to enjoy, whether a book, a video or audiocassette, a CD, or DVD, including music, movies, video games, etc. Keeping track of which titles a consumer has in their media library and where the physical media product for those titles is located can be challenging.

Systems to help home and other users catalog books, movies, and other media are known in the art. For example, there are a number of proprietary database applications that help users create databases to store and manage information about their collections. The information may be typed in, or even scanned from a barcode that is affixed to the product, as is done in large scale inventory control systems for libraries or retailers. In at least one application, the information may be obtained from online sources, such as library or retailer Web sites.

One of the problems with current systems is that they are typically standalone products requiring manual entry of information into a database about each title in a user's physical library or media inventory. The database resides on the user's computer, which can make it difficult to access remotely. The database may also not be readily transportable by the user. Moreover, the information in the database is only accurate and up-to-date if the user takes the time to maintain the database.

Another problem with known database catalogs is that there is no direct connection between the inventory information about a particular title and its current physical location (e.g., in a bookcase(s), CD tower(s), etc.). In addition, the user's physical library may be distributed amongst multiple geographic locations (e.g., different rooms in a home, both at a home and an office, at multiple homes, etc.).

SUMMARY OF THE INVENTION

To address the above-described problems and other shortcomings in the prior art, the present invention provides a system and method for creating and maintaining a virtual library. The virtual library includes one or more images of the user's physical library, and inventory information for the products revealed in those images. The virtual library may represent any type of product that is typically stored in a manner that reveals a side of the product or the product packaging that contains product identification information, such as books or CDs that are stored vertically or horizontally on a shelf to reveal the book spine or the title edge of the CD case, or any other type of product, either packaged or without packaging, which can be identified and inventoried. The present invention generates inventory information from the images using product identification information revealed in the images. Various techniques may used to generate inventory information, such as recognition techniques, barcode processing techniques and image comparison techniques. In addition, a user's historical information, such as prior purchase history, may be used to further generate product identification information.

The present invention also enables a user to search the inventory information for requested products and corresponding images of the requested products. The search may be restricted to a particular collection within the virtual library, if desired. If an image is found that contains a product whose product identifier is responsive to a search request, the image and/or inventory information for the product is displayed. In addition, the physical and/or geographic location of the product may also be identified using a graphical indicia or textual description. The physical product location may be a relative or absolute location of a product in a storage unit, or a combination of both. The relative physical location may be the location of a product as compared to other products captured in the image. The absolute location may be the actual location of the product as depicted in the image.

The present invention may also make the virtual library available to another user, including the images and associated inventory information. For example, an object may be generated to contain the virtual library's images and associated inventory information and transmit the images and information to another user, who may then execute the object and view the virtual library. Alternatively or in addition, a pointer may be generated to the virtual library that enables other users to access and view the virtual library, as well contact the owner.

The present invention may also provide an appraisal of the monetary value of all or selected products in the inventory. In addition, the present invention may provide a user with suggestions for further acquisitions the user may wish to consider purchasing for their physical library. Advice regarding organizing the physical library by genre or other categories may also be provided.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
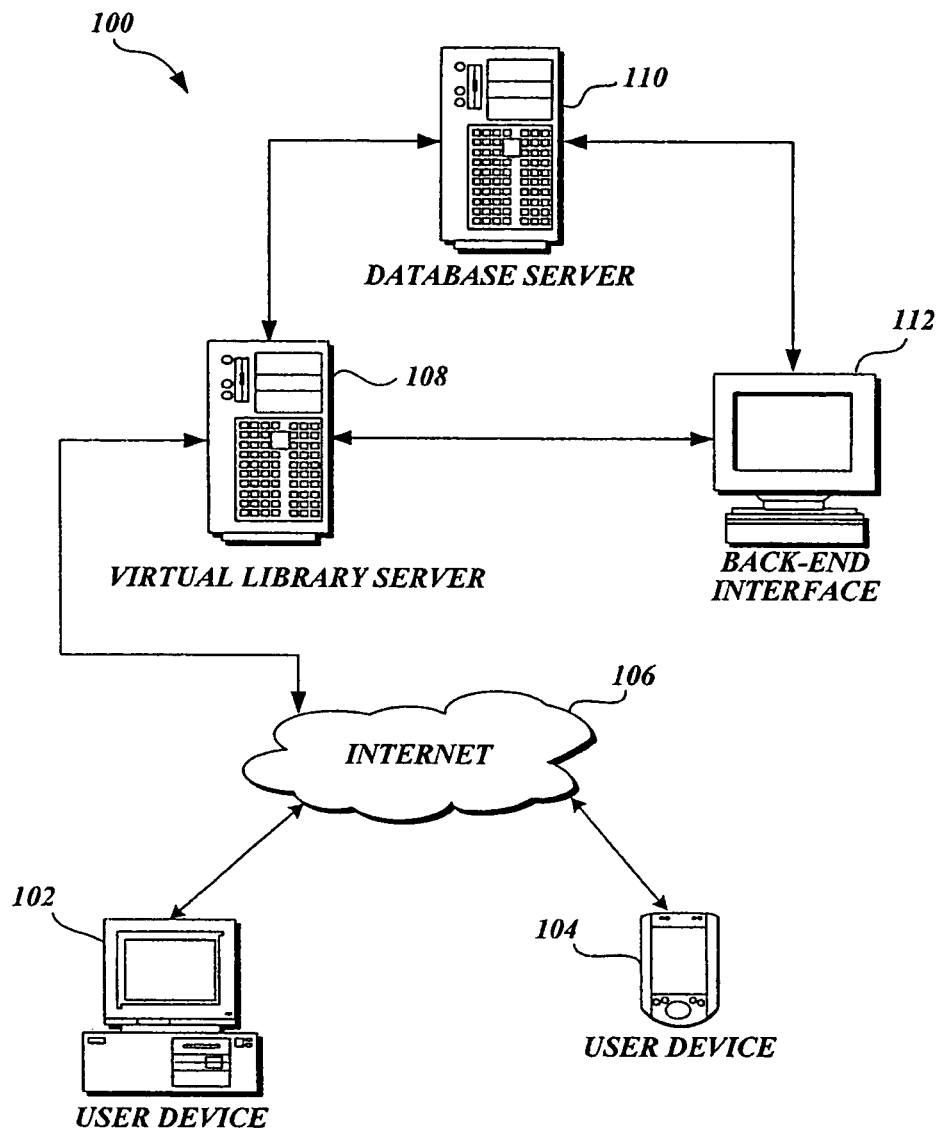
FIG. 1 is a pictorial diagram showing an exemplary operating environment for implementing a method and system that create and maintain a virtual library of products in accordance with an embodiment of the present invention.

FIG. 1 illustrates one operating environment for implementing an embodiment of the present invention. The environment shown includes a virtual librarian system 100 with database and virtual library servers that use images of a user's physical library to create and maintain a virtual library representing a user's physical library. A user's physical library may be located at his/her home, office, or any other site, permanent or transitory, where products capable of being inventoried are found. When such products are owned by the user, a virtual representation thereof may also be referred to as the user's "personal" library.

The virtual librarian environment includes various electronic user devices, such as a computer system 102 and a PDA 104 that individuals can use to communicate with the virtual librarian system 100. In the environment shown in FIG. 1, the user devices 102, 104 communicate with the virtual librarian system 100 via one or more computer networks, such as the Internet 106. Protocols and components for communicating via the Internet are well known to those of ordinary skill in the art of computer network communications. Communication between user devices 102, 104 and the virtual librarian system 100 may also be enabled by local wired or wireless computer network connections.

The virtual librarian system 100 depicted in FIG. 1 operates in a distributed computing environment comprising several computer systems that are interconnected via communication links, e.g., using one or more computer networks or direct connections. However, it will be appreciated by those of ordinary skill in the art that the system 100 could equally operate in a computer system having fewer or greater number of components than are illustrated in FIG. 1. Thus, the depiction of the virtual librarian system 100 in FIG. 1 should be taken as exemplary and not limiting to the scope of the invention.

The virtual librarian system 100, as illustrated, includes a virtual library server 108, a database server 110, and a back-end interface 112. Each of the servers 108 and 110 are described below in more detail. Although the virtual library server 108 and database server 110 are illustrated and described as server computing systems, those skilled in the art and others will appreciate that any type of computing system having sufficient processing power and memory may be used to create and maintain a virtual library as described below without departing from the spirit and scope of the present invention. In addition, for ease of illustration and because it is not important for an understanding of the present invention, the servers 108 and 110 are each depicted as a single computing device. However, as known to those skilled in the art and others, the routines implemented by each of these servers may be performed by two or more computing devices.

In brief, the virtual library server 108 is generally responsible for providing front-end user communication with various user devices, such as devices 102 and 104. The front-end communication provided by the virtual library server 108 may include generating user interfaces comprising text and/or graphics, possibly organized as a Web page using hypertext transfer protocols, for communicating images and information about the users' physical libraries to and from the various user devices 102, 104. The back-end interface 112 allows an operator of the virtual library system 100 to monitor and adjust the operation of the servers 108 and 110 as needed.

In one suitable implementation, the virtual library server 108 enables a user to upload images of their physical library to the database server 110. For example, using a digital camera or other digital imaging device, a user may photograph a bookshelf (or other such physical storage unit) holding all or a portion of the user's product inventory. From the images the server 108 generates an inventory of the products depicted in the images, stores the images and inventory on the database server, and enables the user to view the images and inventory in an easy to use graphical user interface. In one embodiment, the inventory information is generated as described in commonly assigned co-pending U.S. patent application Ser. No. 10/864,291, filed Jun. 9, 2004, and entitled METHOD AND SYSTEM FOR INVENTORY VERIFICATION, the content of which is expressly incorporated herein by reference. Through the interface, the user is given an opportunity to verify that the inventory accurately reflects the products stored in their physical library, as well as to view and locate titles in their library online. As noted above, in one embodiment the images may be obtained from a user's digital images of products stored in their physical library, e.g., on their bookshelves, in which case the images may be uploaded by the user directly to the virtual library server 108, and optionally stored in a database maintained by the database server 110. In yet another embodiment, the images may be constructed by the virtual library server 108 or database server 110 from other images, illustrations, graphics, etc.

The inventory database stored in database server 110 may include information (e.g., title, author/performer, publisher, ISBN, etc.) about various stored products, including (but not limited to) books, audiobooks (cassettes or CDs), music CDs, DVDs, or any other type of product that is capable of being stored in a user's physical library such that the product identification information is revealed on one or more sides of the product when captured in a photographic image of the stored product, and from which a visual identification of the product may be readily made. In one embodiment, the inventory information included in the inventory database may be obtained directly from the product identification revealed on the product as captured in the above-described photographic images using various text and feature recognition techniques. The inventory information may also include information that indicates a relative or absolute physical location of the product within its storage unit, or a combination of both. The relative physical location may be the location of a product as compared to other products captured in the image. The absolute physical location may be identified in a visible label affixed to the bookshelf or media storage unit depicted in the image. In some cases, the location may be represented by a filename associated with the image in which the product is depicted. In yet other embodiments, the absolute physical location may be identified textually as, for example, "second shelf, third book from the left." In such embodiments, the shelf may be identified by determining the number of shelves or rows in the storage unit or bookcase depicted in the image. The inventory information may also include information that identifies the geographic location of the product. The geographic location may be identified in a visible label or by file name, similar to that described above. In addition, the geographic location may be identified generically as, for example, a "home, in den" or "office," or more specifically with a street address or city.

Alternatively, or in addition, the inventory information may be manually input by a user into the virtual library server 108 by reading and entering the information in conjunction with an upload or display of the image of the stored product. The user may be the owner or custodian of the physical library or a third party acting on behalf of the owner or custodian. The physical location of products captured in the image may be the location of the product on a bookshelf in the user's home or office as the user indicated when uploading the image. Similarly, the geographic location of products captured in the image may be the room in a user's home or office, or a street address for the user's home or office as input by the user when uploading the image. Regardless of how the information is obtained, whether from the image itself or from information supplied with the image, or a combination of both, the inventory information may include various attributes that describe and identify the inventoried products, including (but not limited to) title, author/performer, publisher, ISBN, and storage location. The inventory database may further include an index that enables the virtual library server 108 to organize and present the inventoried products and corresponding images to a user according to one or more of these attributes. In one embodiment, the inventory information is generated or obtained as described in commonly assigned, co-pending U.S. patent application Ser. No. 10/864,291, which was previously incorporated herein by reference.

The virtual library server 108 further provides back-end inventory services in cooperation with the database server 110, including generating inventory transactions to update the information and attributes contained in the inventory database. The database server 110, as will be further described below, maintains the databases from which the virtual library server 108 generates the user interfaces, including the user interfaces to the above-described image and inventory databases.

Figure 2:
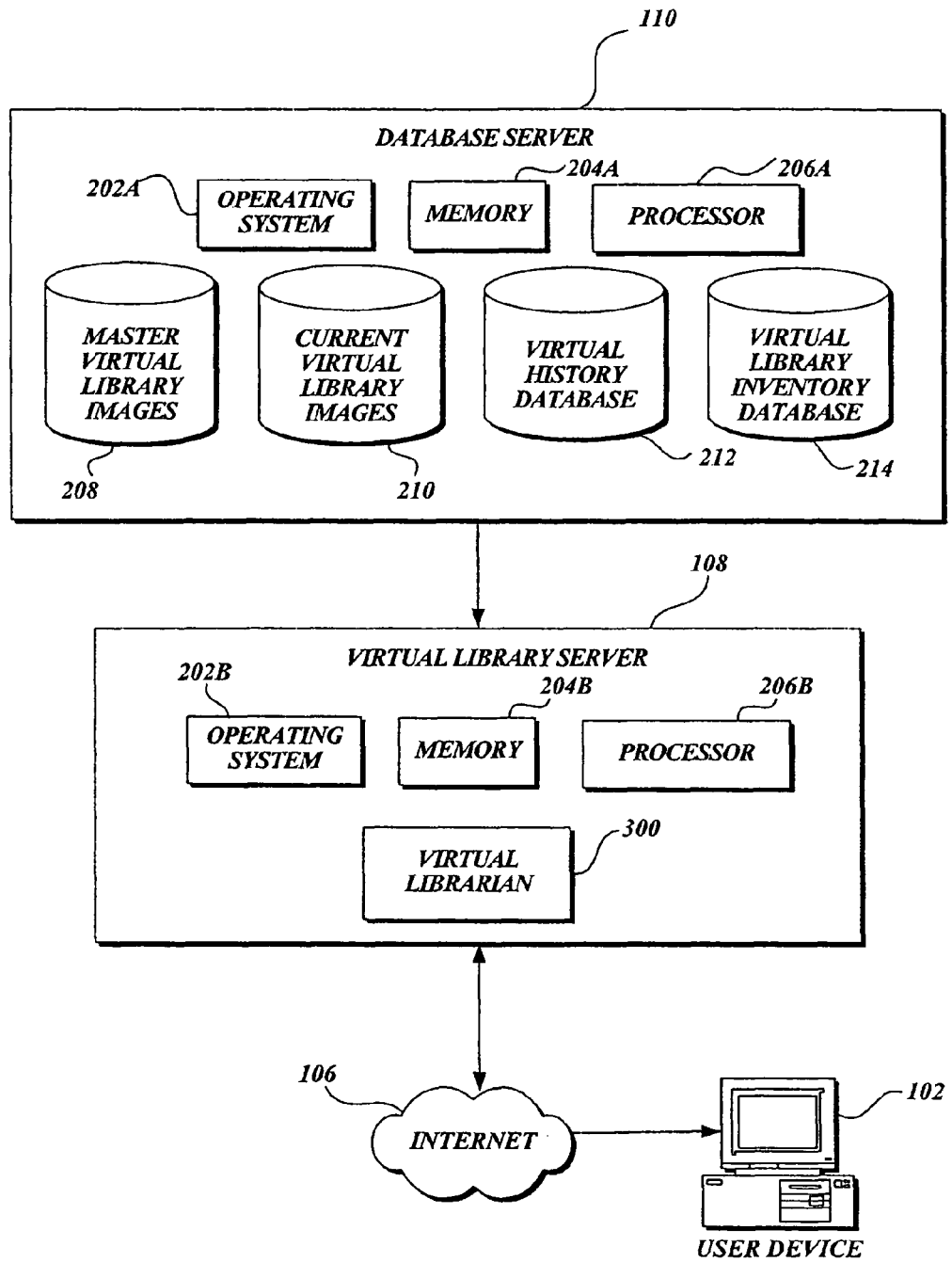
FIG. 2 is a block diagram depicting an arrangement of certain computing components for implementing an embodiment of a virtual librarian system and method consistent with the operating environment depicted in FIG. 1.

FIG. 2 illustrates certain exemplary computing components that are responsible for the operation of the virtual librarian system 100 shown in FIG. 1. The database server 110 includes a master virtual library images database 208, a current virtual library images database 210, a virtual history database 212, and a searchable virtual library inventory database 214. The master virtual library images database 208 contains images that capture the stored products at a certain point in time and from which the inventory information has already been verified using the services of the virtual library server 108. The current virtual library images database 210 contains new images of some or all of the same physical locations captured in the master images 208 of the user's physical library, but at a later point in time.

The virtual history database 212 may contain historical data relating to the purchasing history and behavior of the owner of the physical library. The historical data are used to complement the recognition of stored products when the images of the products are not of sufficient quality to recognize the products that they depict. Lastly, the inventory database 214 contains the product identification and storage location information that make up the inventory of the user's physical library.

In one embodiment, the database server 110 is configured to receive instructions from the virtual library server 108 and return images from the image databases 208, 210, as well as information from the inventory database 214. The images and inventory information enable the virtual library server 108 to display to the user in an integrated manner the presence, physical and/or geographic location, and identification of books, CDs, and other products stored in the user's physical library for purposes of taking and verifying an inventory, determining whether a product is in inventory, and where it is located. For example, the virtual library server 108 may display to the user an image of his or her bookshelf superimposed with a graphic that points to the location of a product on the bookshelf that is already present in their physical library. Since the latest available image of the product may be out-of-date, the graphic may point to the location where the product was last captured.

In the illustrated embodiment, the virtual library server 108 and database server 110 are shown including an operating system 202B and 202A, respectively that provide executable program instructions for the general administration and operation of the servers 108, 110. Suitable implementations for the operating systems 202B and 202A are known or commercially available, and are readily implemented by persons having ordinary skill in the art, particularly in light of the disclosure herein. Those of ordinary skill in the art will recognize that the virtual library server 108 and database server 110 will also typically employ a memory 204B and 204A, respectively, and processor 206B and 206A in which program instructions are stored and executed for operation of the servers. The virtual library server 108 further includes computer program instructions for implementing a virtual librarian process 300 that operates in cooperation with the database server 110 to create and maintain a virtual representation of a user's physical library or libraries. Likewise, the database server 110 further includes executable program instructions for maintaining and updating the databases 208, 210, 212, and 214, and responding to requests received from the virtual library server 108.

For the sake of convenience, much of the description herein is provided in the context of maintaining an inventory of books in a user's physical library, but it should be well understood that the description herein is also applicable to facilitating the creation and maintenance of a an inventory of CD and DVD products, as well as other media products that can be stored together. In fact, the present invention may be applied to any collection of products or items capable of being inventoried, e.g., food products in a pantry, office products in a storeroom, etc. References herein to specific types of products, such as books, audiobooks, etc., are only illustrative and do not serve to limit the general application of the invention.

In addition, the present invention may be applied to create and maintain a virtual library for all products found in a user's physical library. Using books as an example, a virtual library may be created and maintained for all the books stored in a user's bookcase. If the user has more than one bookcase, one or more virtual libraries may be created to represent one or more bookcases. Moreover, the bookcases (and thus, the virtual libraries created to represent them) may be organized into collections by any desirable criteria, e.g., author, genre, owner, fiction, non-fiction, size, color, etc.

Figure 3:
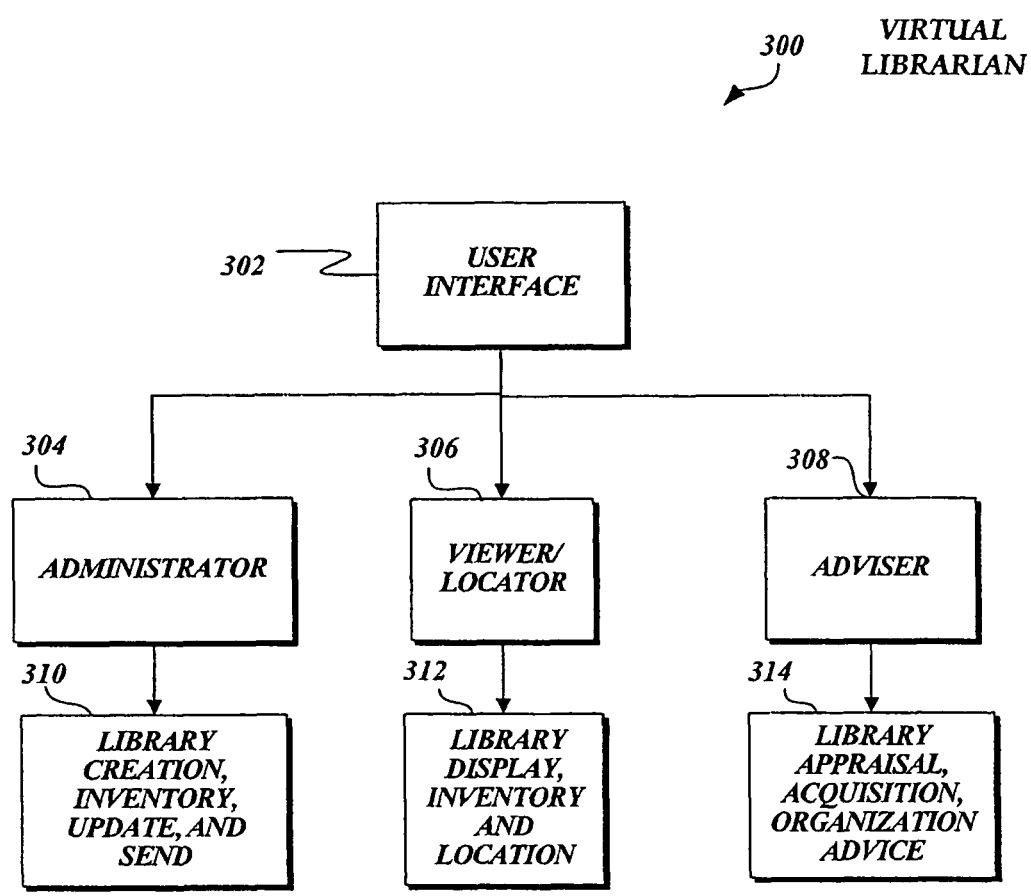
FIG. 3 is a block diagram depicting an arrangement of functional components for implementing an embodiment of a virtual librarian system and method consistent with the operating environment and computing components shown in FIGS. 1 and 2.

FIG. 3 is a block diagram depicting an arrangement of certain exemplary functional computing components for implementing the virtual librarian process 300, as shown and described in the illustrated embodiment with reference to FIGS. 1 and 2. The virtual librarian 300 includes, among others, a process for a user interface 302 to generate user-friendly graphical user interface elements for use when maintaining a virtual library, as will be described in further detail with reference to FIGS. 5-15.

In one embodiment, the virtual librarian 300 further includes an administrator 304 that is responsible for administrative functions 310 such as library creation, inventory taking, library update, and sharing the virtual library with others via email or other communications medium. The virtual librarian 300 may further include a viewer/locator 306 that is responsible for functions 312 of generating and displaying a view of the virtual library images and inventory to a user in response to a request from a user to view, verify, change, or otherwise use the inventory information derived from the images, and to locate particular items of inventory by searching for search terms that may appear in the inventory information associated with an item in the virtual library. In one embodiment, the function 312 of generating and displaying a view of the virtual library to the user in response to the user's request includes a function 312 that will serve to restrict searching the virtual library to a particular collection of the virtual library. A collection is an arbitrary grouping of one or more items of inventory in the virtual library as defined by the user.

The virtual librarian 300 may further include an adviser process 308 that is responsible for performing functions 314 such as appraisals of virtual libraries, making acquisition recommendations based on the inventory of the virtual library, and further making organization recommendations, also based on the inventory of the virtual library as well as any current organization, e.g., the user's collection designations, where a collection is defined as an arbitrary grouping of one or more items of inventory in the virtual library.

FIGS. 4A-4D are flow diagrams describing one embodiment 400 of a virtual librarian process 300 that enables an implementation of a virtual library system 100, as illustrated in FIGS. 1-3. Beginning with reference to FIG. 4A, at process block 402, the virtual librarian process 400 displays a virtual librarian user interface, examples of which are illustrated in detail below with reference to FIGS. 5-15, each of which illustrate a browser program 500 displaying Web pages in which a user is able to interface with the virtual librarian 400 in accordance with an embodiment of the present invention. The Web pages may be generated by the virtual library server 108 and delivered to the user's computing device 102, 104 via the Internet 106.

Figure 4A:
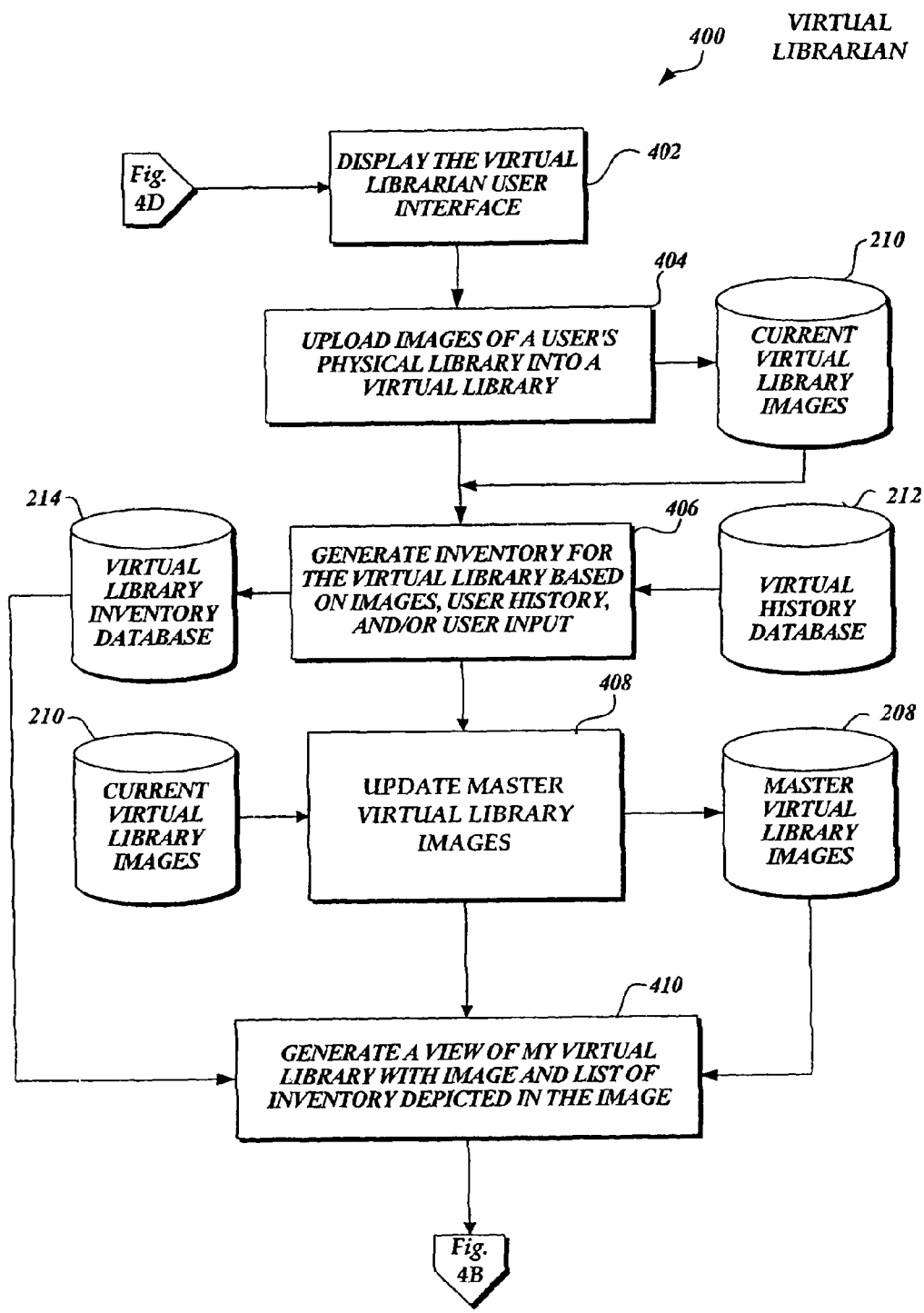
FIGS. 4A-4D are flow diagrams depicting a virtual librarian method formed in accordance with an embodiment of the present invention.
Figure 5:
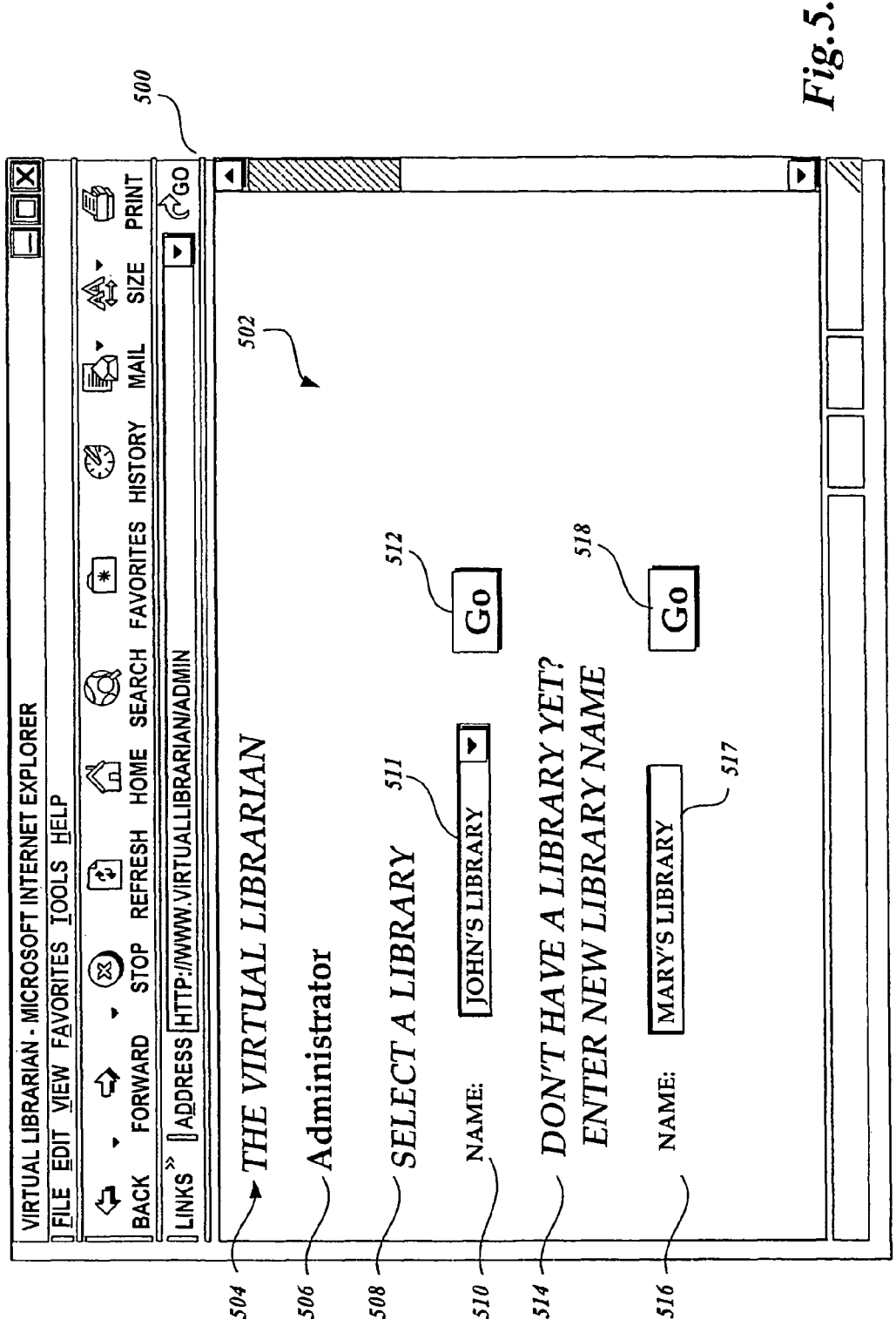
FIG. 5 depicts a browser program with an example Web page presenting a virtual librarian administrator interface to a user in accordance with an embodiment of the present invention.

With reference to FIG. 4A and FIG. 5, the process 400 initially displays, at process block 402, an administrator Web page 502 in which a user is able to select an existing virtual library or to create a new virtual library. In the illustrated example in FIG. 5, the administrator Web page 502 includes a title "The Virtual Librarian" and a subtitle "Administrator" at reference numerals 504 and 506, respectively, to identify the page function, along with two options, "Select a Library," at reference numeral 508, and "Enter New Library Name," at reference numeral 514. For the "Select a Library" option 508, the user is prompted to enter an existing virtual library name at reference numeral 510, in this case by pulling down the list of existing library names at reference numeral 511, and selecting the desired name, here "John's Library." For the "Enter New Library Name" option 514, the user is prompted to enter a new virtual library name at reference numeral 516 in text box 517, here "Mary's Library." Once the name has been supplied, the user is prompted to enter "GO" in command buttons at reference numerals 512, 518, respectively, to branch to the next Web page, illustrated in FIG. 6.

Figure 6:
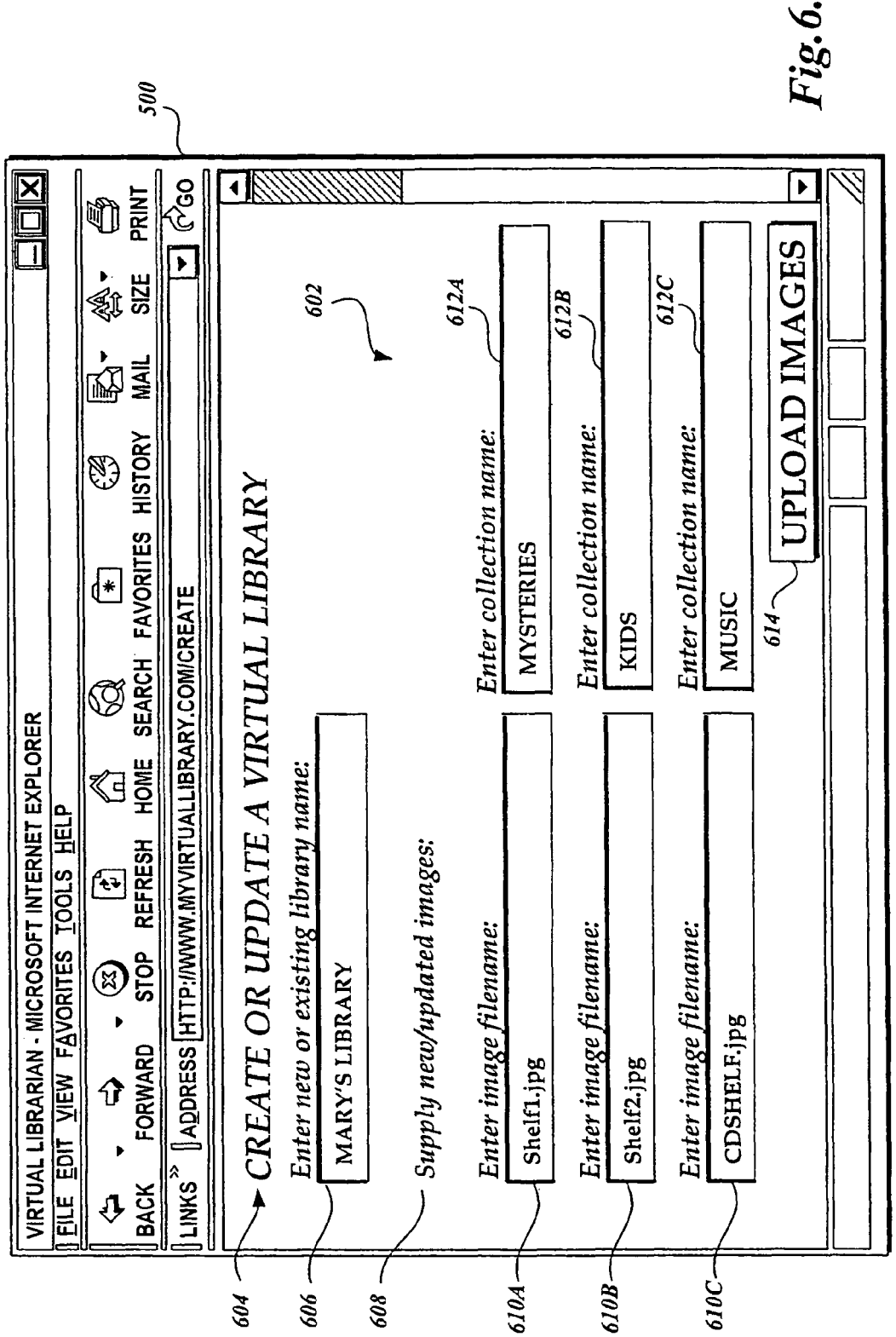
FIG. 6 depicts a browser program with an example Web page presenting a virtual librarian create/update interface to a user in accordance with an embodiment of the invention.

Continuing now with the description in FIG. 4A, at process block 404, the virtual librarian process 400 uploads images of a user's physical library into the current virtual library images database 210 to be stored on the database server 110 using the example Web page interface illustrated in FIG. 6. The Web page interface includes a create or update Web page 602, identified here with the title "Create or Update A Virtual Library" at reference numeral 604, to receive user input for creating or updating a virtual library, beginning with the prompt "Enter new or existing library name" and accompanying text box 606, in this example "Mary's Library." At reference numeral 608, the user is further prompted to "Supply new/updated images" with multiple input areas 610A-C, and 612A-C, in which to enter the image filename and, optionally, a collection name that the user wishes to use to identify the subset of books, CDs, etc., that comprise a collection, and happen to be stored on the particular bookshelf or other storage unit depicted in the image stored in the file designated by the corresponding filename. In the illustrated example in FIG. 6, the user has entered the filename "Shelf1.jpg" at reference numeral 610A and a collection name of "Mysteries" at reference numeral 612A, the filename "Shelf2.jpg" at reference numeral 610B and a collection name of "Kids" at reference numeral 612B, and the filename "CDSHELF.jpg" at reference numeral 610C and a collection name of "Music" at reference numeral 612C. Greater or fewer filenames and corresponding collection names may be entered, depending on how many images the user wishes to upload. Although the image filenames in the illustrated example are all files of type ".jpg" indicating a JPEG type of image file, other kinds of image file formats may be used, e.g., TIFF, BMP, etc.

Once the filenames of the images have been supplied along with any of the optional collection names, the user is further prompted to upload the images into his or her virtual library, the name of which was input at reference numeral 606, at command button labeled "UPLOAD IMAGES" at reference numeral 614. Activating the command button "UPLOAD IMAGES" at reference numeral 614 will cause the virtual librarian process 400 to begin the process of uploading the images to a new or existing virtual library in the current virtual library images database 210 as explained in further detail below.

Continuing now with the description in FIG. 4A, at process block 406, the virtual librarian process 400 generates inventory information to be stored in the virtual library inventory database 214 for the virtual library named in text box 606 in FIG. 6. The generation of the inventory information is based primarily on the product identification information revealed in the images that were uploaded to the current virtual library images database 210 at process block 404. In one embodiment, the inventory is generated as described in commonly assigned co-pending U.S. patent application Ser. No. 10/864, 291, which was previously incorporated herein by reference. For example, the product identification information may include various distinguishing attributes of the product or the product's packaging. The attributes may include text, e.g., author, performer, title, publisher, ISBN number, etc.; graphics, e.g., cover artwork, logo, typeface, etc.; and/or physical characteristics, e.g., product dimensions, shape, color, reflectivity, etc., with or without packaging, however the product is stored. Generating the inventory information from the product identification information may include recognizing the product identification through the heuristic application of one or more recognition techniques to the image in an effort to resolve ambiguities and improve the reliability of the recognition without having to resort to manual efforts to determine what products are stored on a particular shelf or location. The recognition techniques include the application of text recognition or other optical character or feature recognition techniques to the attributes contained in the product identification information, e.g., the product's text, graphics, and/or other physical characteristics.

In yet other embodiments, the product identification information may be obtained using the product's barcode, if the barcode is captured in the image, as described in commonly assigned co-pending U.S. patent application Ser. No. 10/749, 473 filed Dec. 31, 2003, and entitled SYSTEM AND METHOD FOR OBTAINING INFORMATION RELATING TO AN ITEM OF COMMERCE USING A PORTABLE IMAGING DEVICE, the content of which is expressly incorporated herein by reference.

Since the image or images of the user's physical library may include more than one product stored in a particular location, recognizing the product identification may employ various pattern recognition techniques known in the art. For example, edge detection may be used to first isolate a portion of the photographic image before attempting to recognize the product identification, where the isolated portion of the image is of a single product stored in the location. In addition, the method for recognizing the product identification may rotate the image in different orientations prior to the application of the recognition technique so as to maximize the chances of recognizing products stored in different orientations, e.g., horizontal, vertical, or somewhere in between.

In one embodiment, recognition of the product identification information may be achieved through comparison to a reference image of the product for which product identification is already known or from which it can be recognized. This is particularly useful when the received photographic image, or isolated portion of the image, carries insufficient detail for proper recognition or is otherwise deficient, such as when the storage location is in partial shadow, improperly lighted, or where the stored products are worn or used such that the appearance of the distinguishing attributes comprising the product's identification information has deteriorated. The reference image may include a complete reference identification of a product, such as an image of a book spine complete with title and author, and in some cases may be obtained from a photographic image or digital scan of the product carried out especially for that purpose when the item is initially unboxed and added to inventory. The reference image may be further inferred from an image of the product that includes that portion of the image that is to be used as the reference image, such as when the reference image is an image of the spine of a book that has been inferred from one or more images of the book's front and back covers. One or more reference images may also be kept for the same product. For example, a pair of reference images may be kept of the same book spine. However, one image may be of the jacketed book and the other of the same book without the jacket. Moreover, reference images of the same book, but different printings, e.g., hardcover versus paperback, etc., may be kept.

In one embodiment, recognizing the product identification revealed on one or more sides of the product as captured in the photographic image may rely on a previous recognition of that product, i.e., the method is self-learning. For example, the reference image may be obtained from previously-received photographic images of the product from which accurate recognition was achieved. Comparison to such a reference image may increase the reliability of recognition when receiving subsequent photographic images that include the product in question.

In one embodiment, should the identification information revealed in the images be inadequate to fully recognize the identity of the books, CDs, etc., depicted in the images, the virtual librarian process 400 consults historical data obtained from the virtual history database 212 to determine whether there exists any information associated with the user that provides a hint as to the identity of the books, CDs, etc., depicted in the image. The historical data may be any data gathered about the user with respect to the contents of his or her physical library. For example, the historical data may provide information as to the identity of books and CDs that the user has purchased in the past, or the genres that the user is most likely to have in their physical library.

In yet another embodiment of the present invention, if some product identification information can be recognized from the image, the product identification information may be used to locate or identify the remaining inventory information. For example, if a portion of the title of a book is recognized, the title may be parsed and compared to an inventory or listing of known titles until a match is found. In order to reduce computation and search time, it may be assumed that the product to be recognized is physically grouped with similar products. For example, in one embodiment, it may be assumed the book to be recognized is stored with other books of the same genre. Accordingly, if another book in the same physical location, e.g., on the same "shelf," has been identified as a "gardening" book then the portions of the title of the book to be recognized are parsed and compared to other "gardening" titles. If a match is not found, the scope of the search may be widened to include "home and garden," and so on until a match is found. Since products may be organized based on various criteria, those skilled in the art will recognize that in other embodiments such searches may be conduct based on other criteria, e.g., by author, Dewey decimal classification, etc.

After exhausting attempts to recognize products directly from the uploaded photographic image, either alone or in combination with a reference image or a hint present in the historical data, recognition may be achieved through display of the image of the user's physical library to the user and prompting him or her to resolve any remaining ambiguities in recognizing the identification of the product by entering the product identification information, such as version (e.g., hardcover, softcover, audio, etc.), author, title, etc., as necessary. Alternatively, all or portions of the image of the user's physical library (such as only those portions pertaining to the ambiguous product) may be displayed in an anonymous fashion to third parties. The displayed portion may be supplemented with information that is helpful in resolving the ambiguity, such as a list of alternate possibilities as to the identity of the ambiguous product. The third parties may be offered remuneration or other compensation in exchange for identifying the ambiguous product and for entering any additional product identification information. In either case, the entered product identification information is associated with the uploaded photographic image of the product, thereby further increasing the chances of accurate recognition when receiving subsequent uploaded photographic images that include the product in question.

Continuing now with the description in FIG. 4A, at process block 408, the virtual librarian process 400 updates the master virtual library images database 208 with the current virtual library images 210. Any previous images of the user's library may be archived or discarded. At process block 410, the virtual librarian process 400 generates a view of the virtual library, the view including a display of the images of the virtual library as stored on the master virtual library images database 208, in conjunction with the list of the inventory depicted in the image as stored on the virtual library inventory database 214.

Figure 7:
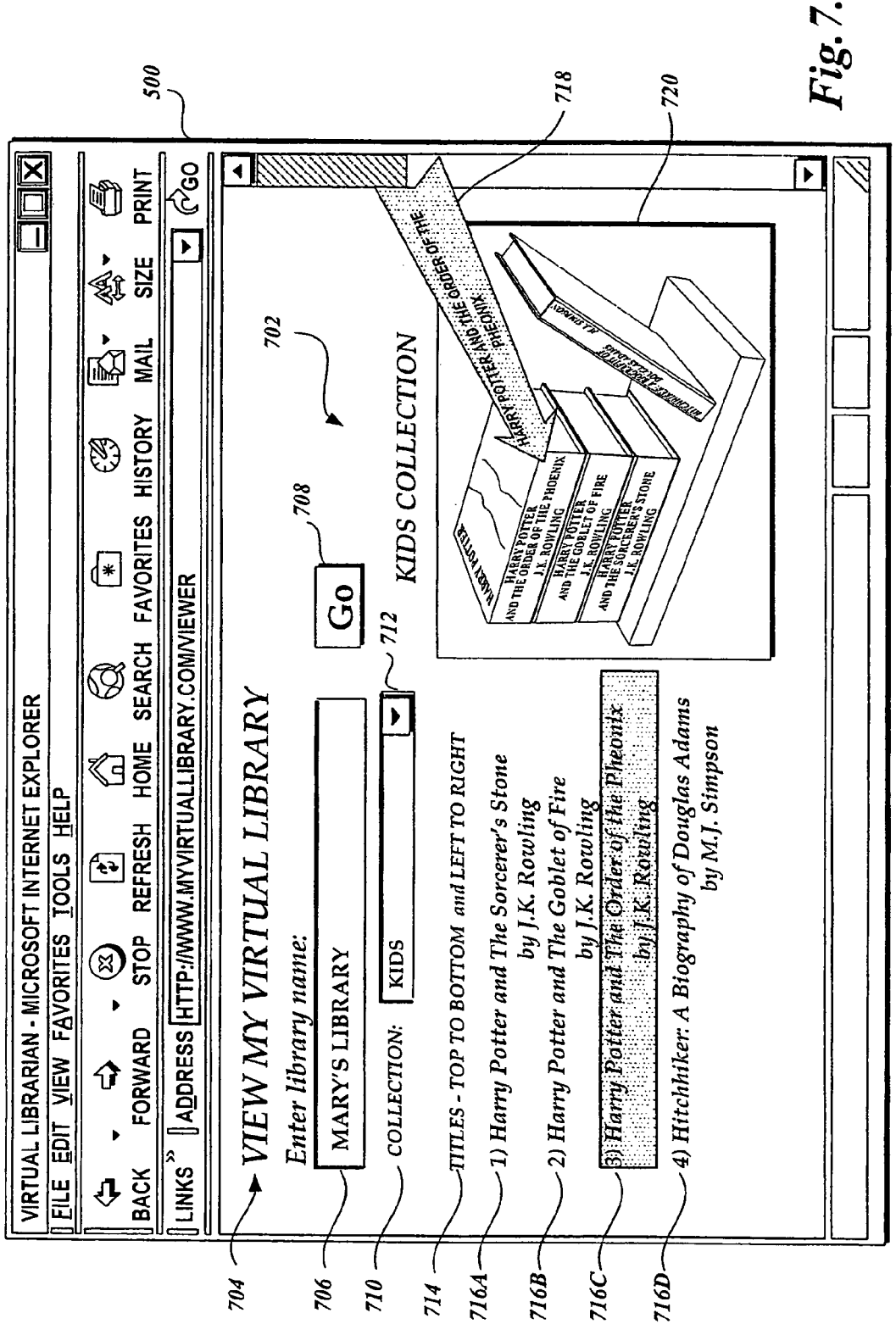
FIG. 7 depicts a browser program with an example Web page presenting a virtual librarian viewer interface to a user in accordance with an embodiment of the invention.
Figure 8:
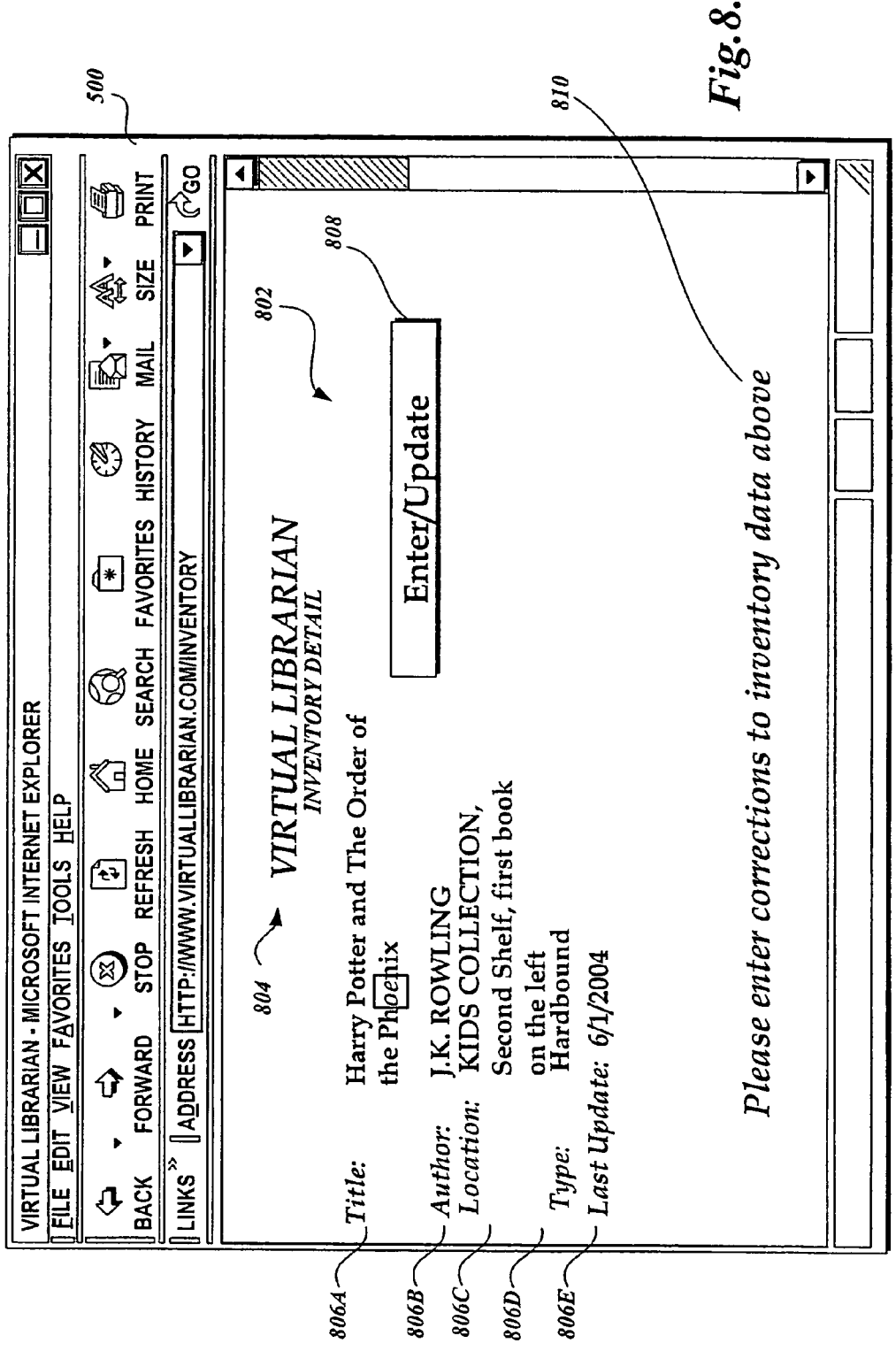
FIG. 8 depicts a browser program with an example Web page presenting a virtual librarian inventory interface to a user in accordance with an embodiment of the invention.
Figure 9:
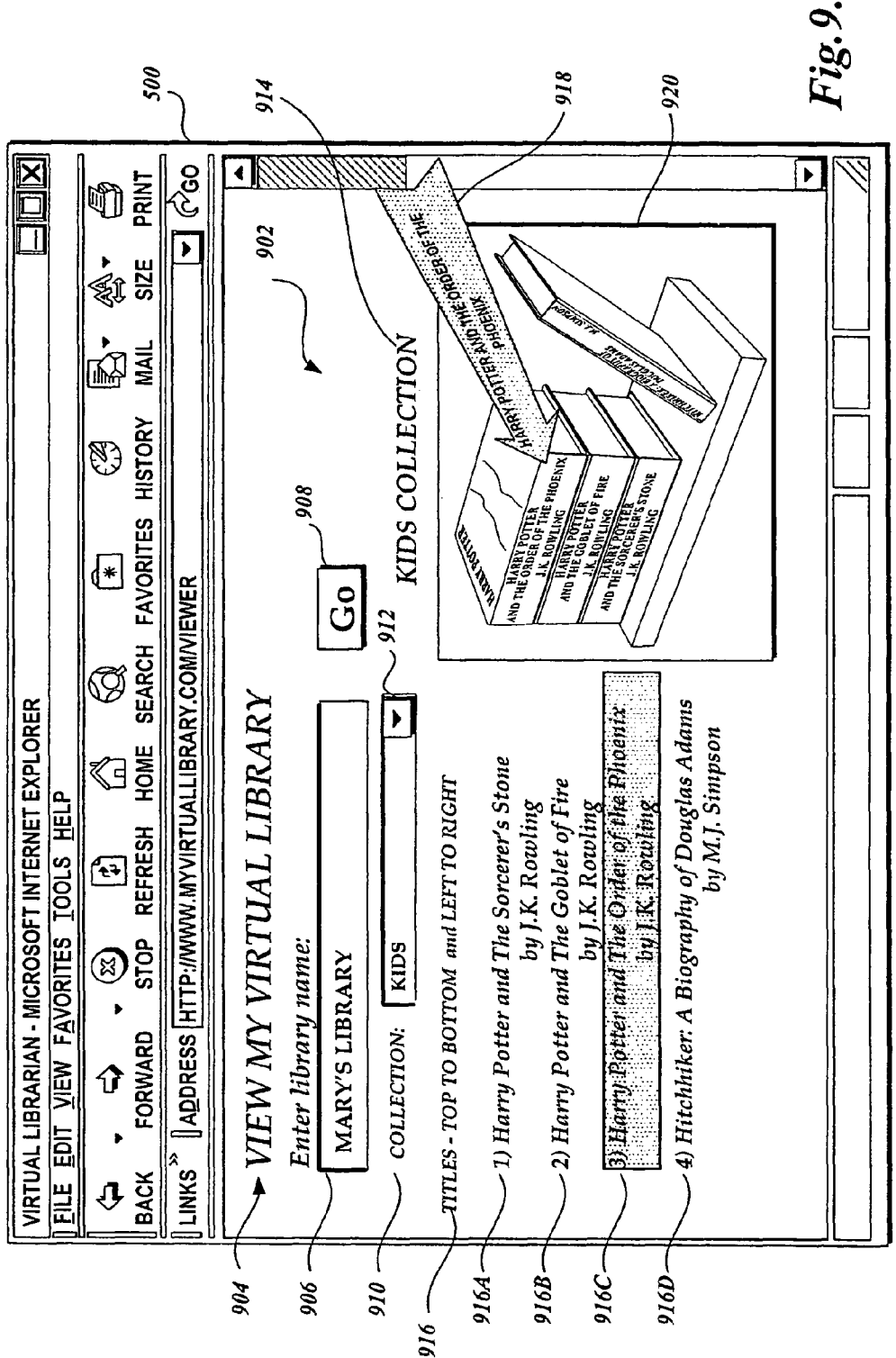
FIG. 9 depicts a browser program with an example Web page presenting a virtual librarian viewer interface to a user in accordance with an embodiment of the invention illustrating an updated inventory from FIG. 8.
Figure 10:
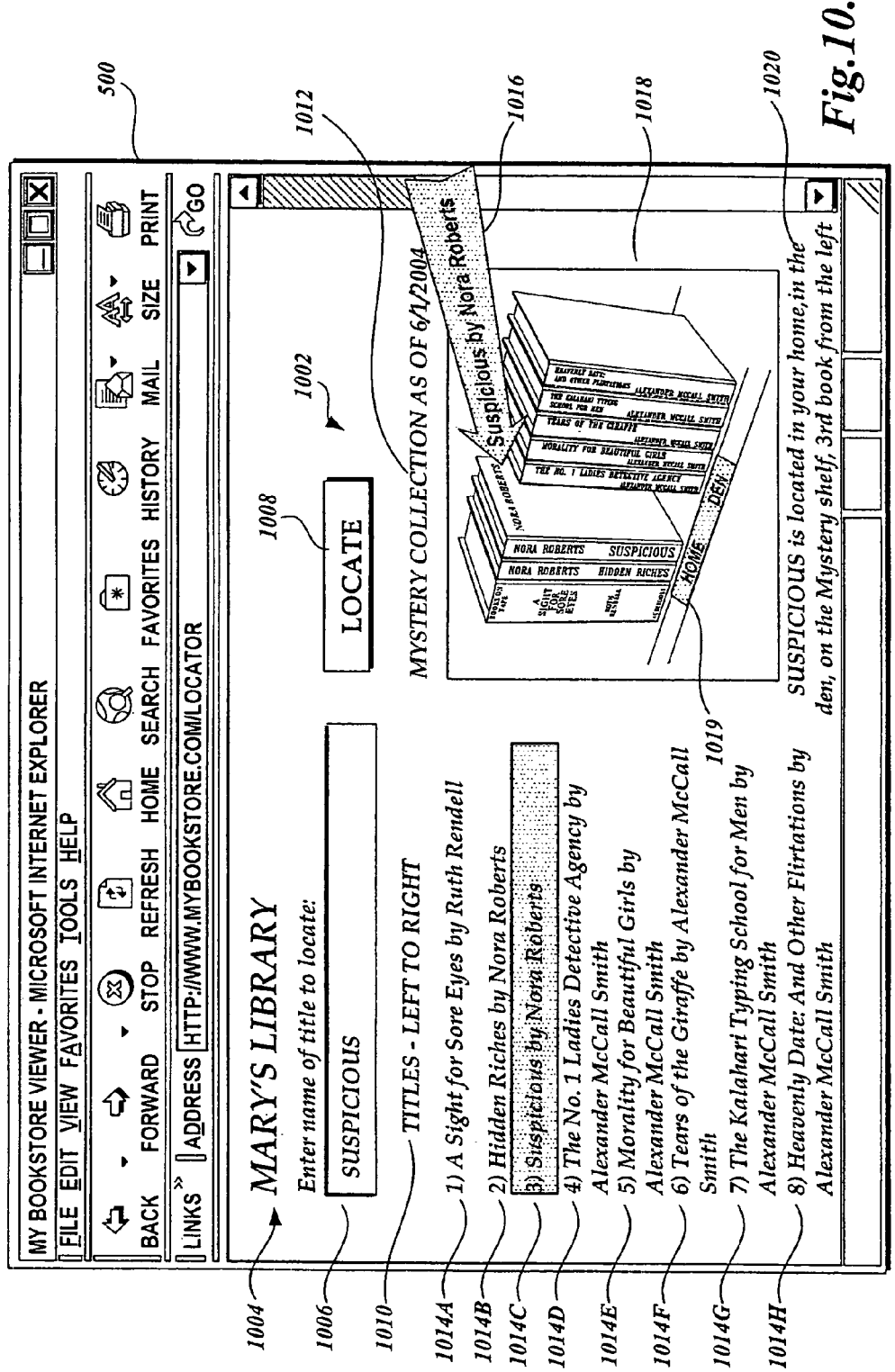
FIG. 10 depicts a browser program with an example Web page presenting a virtual librarian locator interface to a user in accordance with an embodiment of the invention.

An example of the view generated by the virtual librarian process 400 at process block 410 is illustrated in FIGS. 7 and 9, with FIG. 7 illustrating a view of the "Kids" collection in "Mary's Library" before any corrections to the inventory data as described in FIG. 8 (and process block 412 in FIG. 4B below), and FIG. 9 illustrating the same view after corrections. Specifically, FIGS. 7 and 9 illustrate an example Web page interface for a virtual library viewer, including a viewer Web page at reference numerals 702, 902, identified here with the title "View My Virtual Library" at reference numerals 704, 904. The viewer Web page 702, 902 further includes a prompt to enter the library name in the accompanying text box 706, 906, in this example "Mary's Library." At reference numeral 708, 908, is a command button labeled "GO," which, when activated, will cause the virtual librarian process 400 to display an image associated with Mary's Library, as well as the inventory information corresponding to the image. In the illustrated example, at reference numeral 710, 910, the user is further prompted to select from a drop-down box at reference numeral 712, 912, the name of the collection in "Mary's Library" that the user would like to view, in this example the "Kids" collection. After the selection has been made, the image from the master virtual library images database 208 associated with the "Kids" collection of "Mary's Library" is displayed at reference numeral 720, 920. Alongside the display of the image, the virtual librarian process 400 further displays the corresponding inventory information as obtained from the virtual library inventory database 214, here entitled "Titles—Top to Bottom and Left to Right" at reference numeral 714, 914, followed by the inventory information identifying the titles "Harry Potter and the Sorcerer's Stone" at reference numeral 716A, 916A "Harry Potter and the Goblet of Fire" at reference numeral 716B, 916B "Harry Potter and the Order of the Pheonix" [sic], at reference numeral 716C (corrected at reference numeral 916C), and "Hitchhiker: A Biography of Douglas Adams," at reference numeral 716D, 916D.

In one embodiment of the present invention, an image for the selected collection from the master virtual library database may not be available or may not be of sufficient quality. In such cases, the virtual librarian process 300 may construct a substitute graphical representation (e.g., using illustrations, stock images, etc.) of the collection. The product in the collection can then be displayed, for example, as sorted by author, title, etc.

Returning now to FIG. 4B, the virtual librarian process 400 continues at process block 412 to update, correct, and reorganize the inventory in response to user input to the viewer interface generated at process block 410. In the illustrated viewer interface in FIG. 7, the user has selected the third Harry Potter title at reference numeral 716C, "Harry Potter and the Order of the Pheonix," [sic] to correct the error in the spelling of "Phoenix," as further described below. As shown in the illustrated example, when the user selects a particular title, the images appearing at reference numerals 720, 920 are overlaid with a graphical indicia 718, 918 that calls attention to the location in the image of the selected title as described in further detail with reference to process block 416 in FIG. 4B. In this example, the graphical indicia 718, 918 is an arrow that contains the title of the selection, and whose endpoint clearly points to the selected title.

Continuing now with process block 412, once a particular title in the virtual library has been selected, the user may navigate to a detailed inventory interface as illustrated in FIG. 8. FIG. 8 illustrates an example Web page interface for a virtual library inventory at reference numeral 802, identified here with the title "Virtual Librarian Inventory Detail," at reference numeral 804, followed by identification information obtained from the virtual library inventory database 214, here including the title at reference numeral 806A, "Harry Potter and the Order of the Phoenix," the author at reference numeral 806B, "J. K. Rowling," the location at reference numeral 806C, "Kids Collection, second shelf, first book on the left," the book type at reference numeral 806D, "Hardbound," and the date of the last update at reference numeral 806E, "Jun. 1, 2004." The user is prompted to "Please enter corrections to inventory data above," at reference numeral 810, and is further provided with a command button at reference numeral 808 that is labeled "ENTER/UPDATE." Activating the command button 808 causes the virtual librarian process 400 to update the virtual library inventory database 214 with the edited input as it appears on the Web page inventory interface 802. In this example, the user has re-entered the title to correct the spelling of "Phoenix." The user may also choose to reorganize the contents of their virtual library by updating the location and collection designations associated with the title. Reorganizing the contents of the virtual library is discussed in further detail with reference to process block 434 in FIG. 4D and FIG. 15 below.

Returning now to FIG. 4B, the virtual librarian process 400 continues at process block 414 to search for particular items or products, e.g., particular titles, in the virtual library in response to the entry by the user of a search term, and at process block 416, to display a located product with the image depicting the product, a graphic overlaid on the image, and/or a textual description of the location of the product in the virtual library. In the illustrated locator interface 1002 illustrated in FIG. 10, the user has selected the virtual library named "Mary's Library" at reference numeral 1004 in which to search for products containing the search term "SUSPICIOUS" as entered in text box 1006, to locate the Nora Roberts mystery entitled "Suspicious." When the user activates the command button labeled "LOCATE" appearing at reference numeral 1008, the virtual librarian process 400 commences a text search of the inventory information contained in the virtual library inventory database 214 for "Mary's Library," to determine whether there are any items in inventory containing the search term "SUSPICIOUS." In one embodiment, the virtual librarian 400 restricts the text search of the inventory information to a particular subset of the inventory, such as a particular subset of the inventory belonging to a collection, e.g., the "Mystery" collection. The particular subset within which to restrict the search includes subsets identified as collections as specified by a user before or during the uploading of an image to a virtual library. The particular subset within which to restrict the search may also include subsets identified as collections during an update or reorganization of the virtual library. In the illustrated example, the title "SUSPICIOUS" is found in the "Mystery" collection in "Mary's Library." The virtual library process 400 displays the corresponding image at reference numeral 1018 of the bookshelf entitled the Mystery collection at reference numeral 1012, and displays a graphical indicia in the form of a location arrow at reference numeral 1016 to point out the physical location of the title on the bookshelf (or, at least, the physical location of the book at the time that the image was taken). In addition, the virtual library process 400 may display a graphical indicia in the form of a highlighted bar 1019 to identify where the bookshelf is geographically located, i.e., in the user's home, in the den. To the left of the image is displayed a list of inventory captured in the image, the list captioned "Titles—Left to Right" at reference numeral 1010 to indicate that the list corresponds to the appearance of the titles on the bookshelf in order from left to right. The caption 1010 is followed by the inventory information obtained from the virtual library inventory database 214, here listed as "A Sight for Sore Eyes by Ruth Rendell" at reference numeral 1014A, "Hidden Riches by Nora Roberts" at reference numeral 1014B, "Suspicious by Nora Roberts" at reference numeral 1014C, "The No. 1 Ladies Detective Agency by Alexander McCall Smith" at reference numeral 1014D, "Morality for Beautiful Girls by Alexander McCall Smith" at reference numeral 1014E, "Tears of the Giraffe by Alexander McCall Smith" at reference numeral 1014F, "The Kalahari Typing School for Men by Alexander McCall Smith" at reference numeral 1014G, and "Heavenly Date: And Other Flirtations by Alexander McCall Smith," at reference numeral 1014H. In addition to calling out the location of the title in the image with the location arrow at reference numeral 1016, the virtual library process 400 may also highlight the listing of the inventory information associated with the located title as illustrated in the highlighting appearing around the listing of "Suspicious by Nora Roberts," at reference numeral 1014C. In one embodiment, the physical and/or geographic location of the title is also described in text, as illustrated in the example text "SUSPICIOUS is located in your home, in the den, on Mystery shelf, 3rd book from the left," appearing at reference numeral 1020, below the image 1018.

Figure 4B:
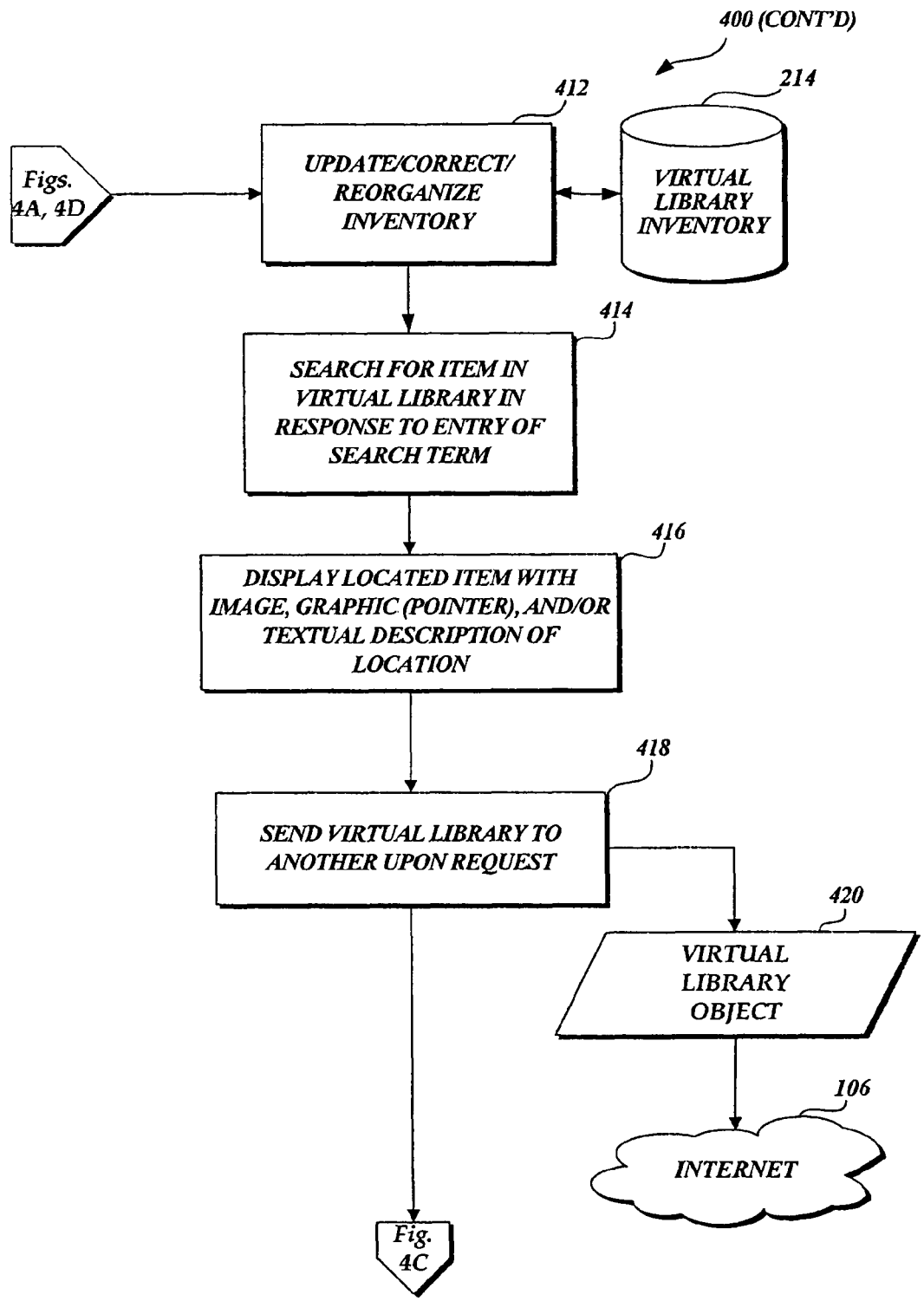

Returning now to FIG. 4B, the virtual librarian process 400 continues at process block 418, to allow the user to make his or her virtual library available to another user. For example, as illustrated in FIG. 4B, the user sends his or her virtual library to another user upon request. More specifically, the process includes generating a virtual library object at reference numeral 420, where the virtual library object is a file that contains the image or images that comprise the virtual library, as well as the inventory information derived from those images, and possibly corrected, changed, and/or added during user interaction with the virtual librarian 300. In one embodiment, the virtual library object 420 is in a file format that allows the object to be attached to an electronic mail message for sending to another user via the Internet 106, e.g., attached to a message "Here's my bookshelf!" The user receiving the virtual library object 420 may open it to browse the sender's virtual library using the view interface of the virtual library as described with reference to process block 410 in FIG. 4A, and as illustrated with reference to FIGS. 7 and 9. In one embodiment, the virtual library object 420 is self-executing so that it may operate on any number of client devices 102 even though the device has no access to the virtual library and database servers 108, 110.

Figure 11:
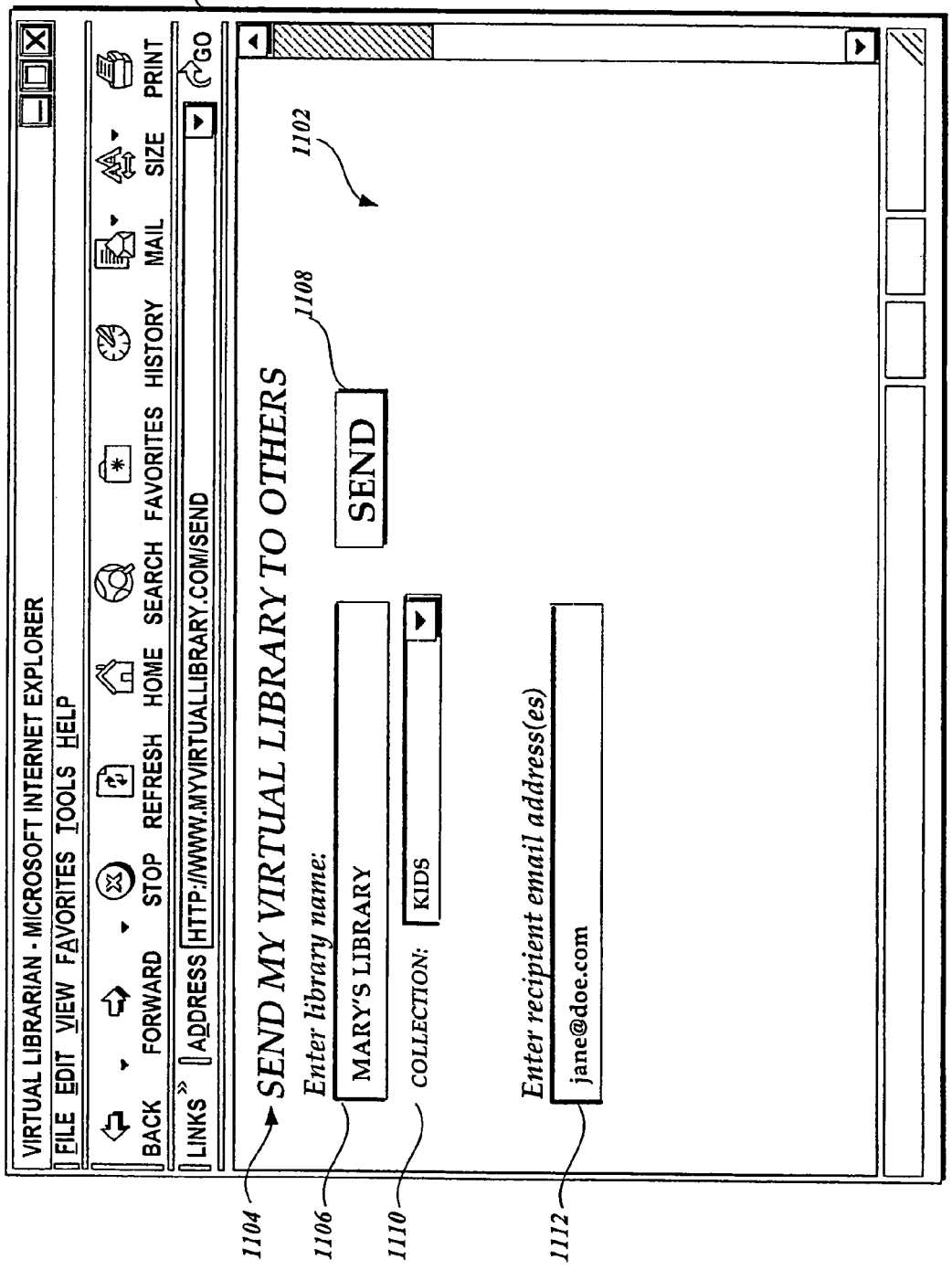
FIG. 11 depicts a browser program with an example Web page presenting a virtual sending interface to a user to send a virtual library to another user in accordance with an embodiment of the invention.
Figure 12:
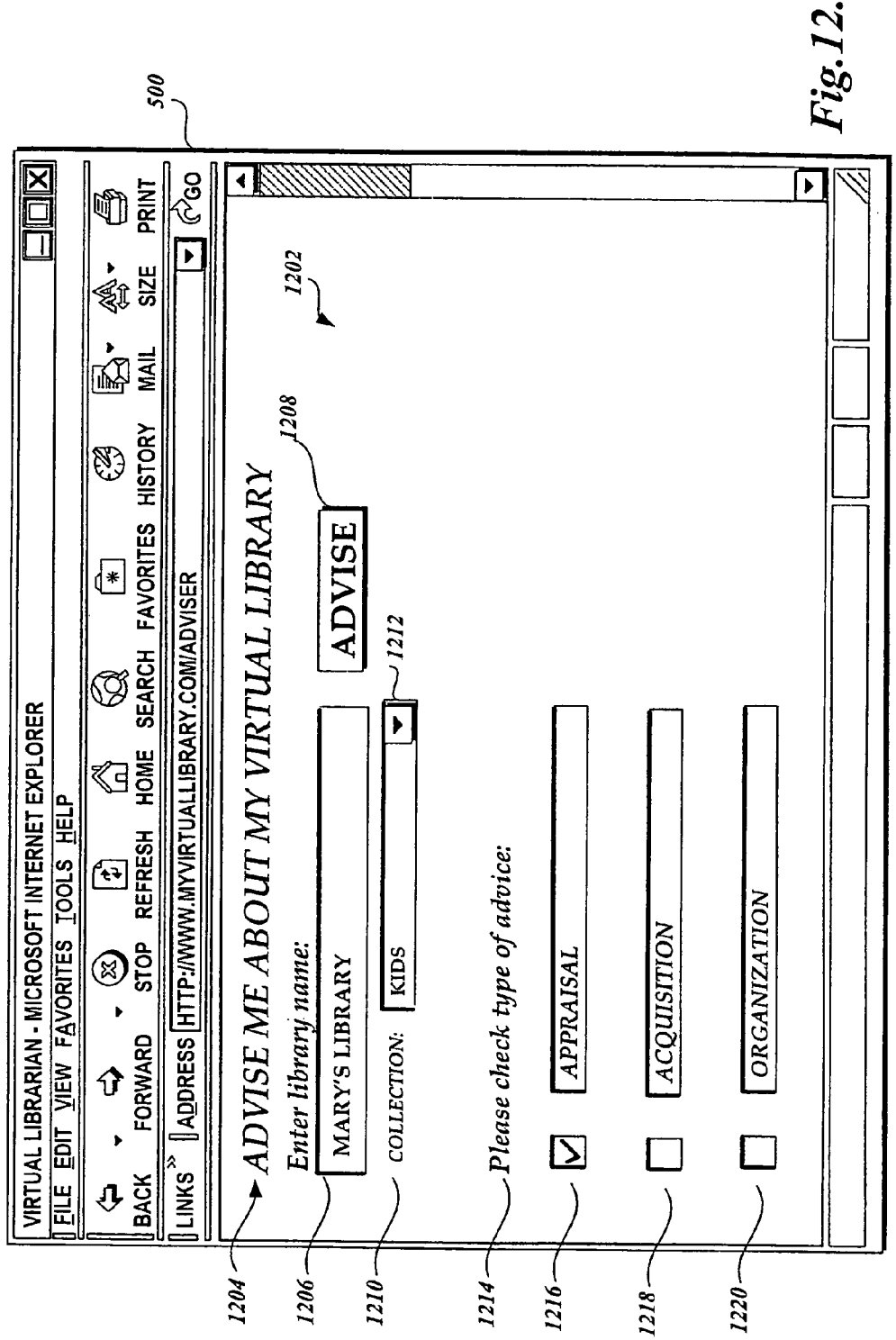
FIG. 12 depicts a browser program with an example Web page presenting a virtual librarian adviser interface to a user in accordance with an embodiment of the invention.

In the illustrated send interface 1102 in FIG. 11, entitled "Send My Virtual Library to Others" at reference numeral 1104, the user has entered the library named "Mary's Library" in a text box at reference numeral 1106, and optionally a collection within the library, here entered in a text box at reference numeral 1110 as the "Kids" collection. The user is further prompted to enter in a text box appearing in reference numeral 1112, a recipient email address of the other user to whom the virtual library is to be sent, in this example entered as "jane@doe.com." The virtual library process 400 further provides a command button at reference numeral 1108 labeled "SEND," which, when activated, will cause the process 400 to prepare to send the virtual library to the other user. In one embodiment, sending the virtual library may include packaging the specified library, or collection from the library, into an object that comprises the image or images and inventory associated with the images, where the object is capable of transport to another user on another computer, in this case to the email addressee "jane@doe.com."

In an alternate embodiment, the "SEND" button will cause the process 400 to generate or obtain a pointer or link to the specified virtual library, or collection from the library, and to send or otherwise notify the other user that the pointer may be used to access the virtual library. Accordingly, the other user may access the virtual library, request to borrow products from the virtual library or otherwise contact the user of the virtual library. In yet other embodiments, the other user may copy one or more images from the virtual library and store the copied images in his or her virtual library images database 210 and/or master virtual library images database 208. The images can then be used by the virtual librarian process 300 implemented by the other user as reference images as described above. In yet other embodiments, the images obtained may be combined with the other user's images to create new or updated images. It should be understood that the example in FIG. 11 is provided for the sake of illustration only. Other means of communication besides electronic mail, objects, and pointers may be used to provide access to a virtual library to another user.

Figure 4C:
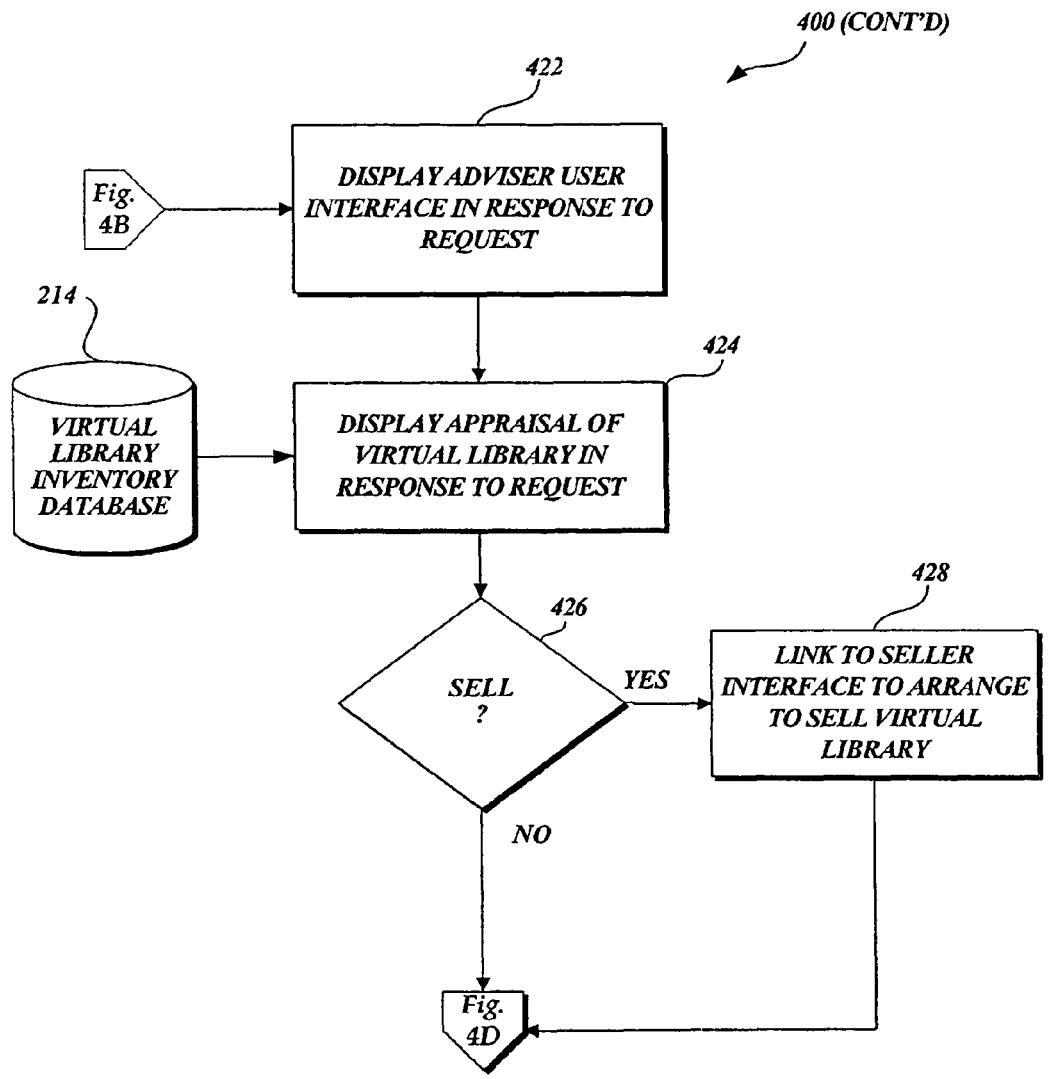

Referring now to FIG. 4C, the virtual librarian process 400 continues at process block 422, to display an adviser user interface to the user in response to a request for advice from the virtual librarian 300 regarding a particular virtual library. In the illustrated adviser interface in FIG. 12 at reference numeral 1202, entitled "Advise Me About My Virtual Library" at reference numeral 1204, the user has entered the name of the virtual library "Mary's Library" at reference numeral 1206 for which the user is seeking advice. The user is optionally prompted to select the name of a particular collection at reference numeral 1210 within the virtual library for which advice is sought using a drop-down box at reference numeral 1212, here selecting the "Kids" collection. The virtual library process 400 further prompts the user to specify at reference numeral 1214 "Please check type of advice," what type of advice he or she is seeking, below which appears selection options for the type of advice. In this example, the selection options provided include an appraisal of the library at reference numeral 1216, acquisition recommendations at reference numeral 1218, and organization advice at reference numeral 1220. The virtual library process 400 provides the user with a command button at reference numeral 1208 labeled "ADVISE," that may be activated by the user to cause the virtual librarian process 400 to, in turn, cause the Web browser program 500 to display the selected interface for the type of advice that is being sought, for the specified library and collection.

Returning now to FIG. 4C, when the user has requested advice regarding an appraisal of their virtual library at process block 424, the virtual librarian process 400 computes or otherwise obtains an appraisal of the inventory associated with the designated library as stored in the virtual library inventory database 214, and, optionally, confines the appraisal to a collection within the library if so designated by the user in the adviser interface described above with reference to FIG. 12. The process 400 further continues at decision block 426 to determine whether user wishes to sell their virtual library, and, if so, branches to process block 428, where the user can link to a seller interface to arrange to sell the contents of their virtual library online.

Figure 13:
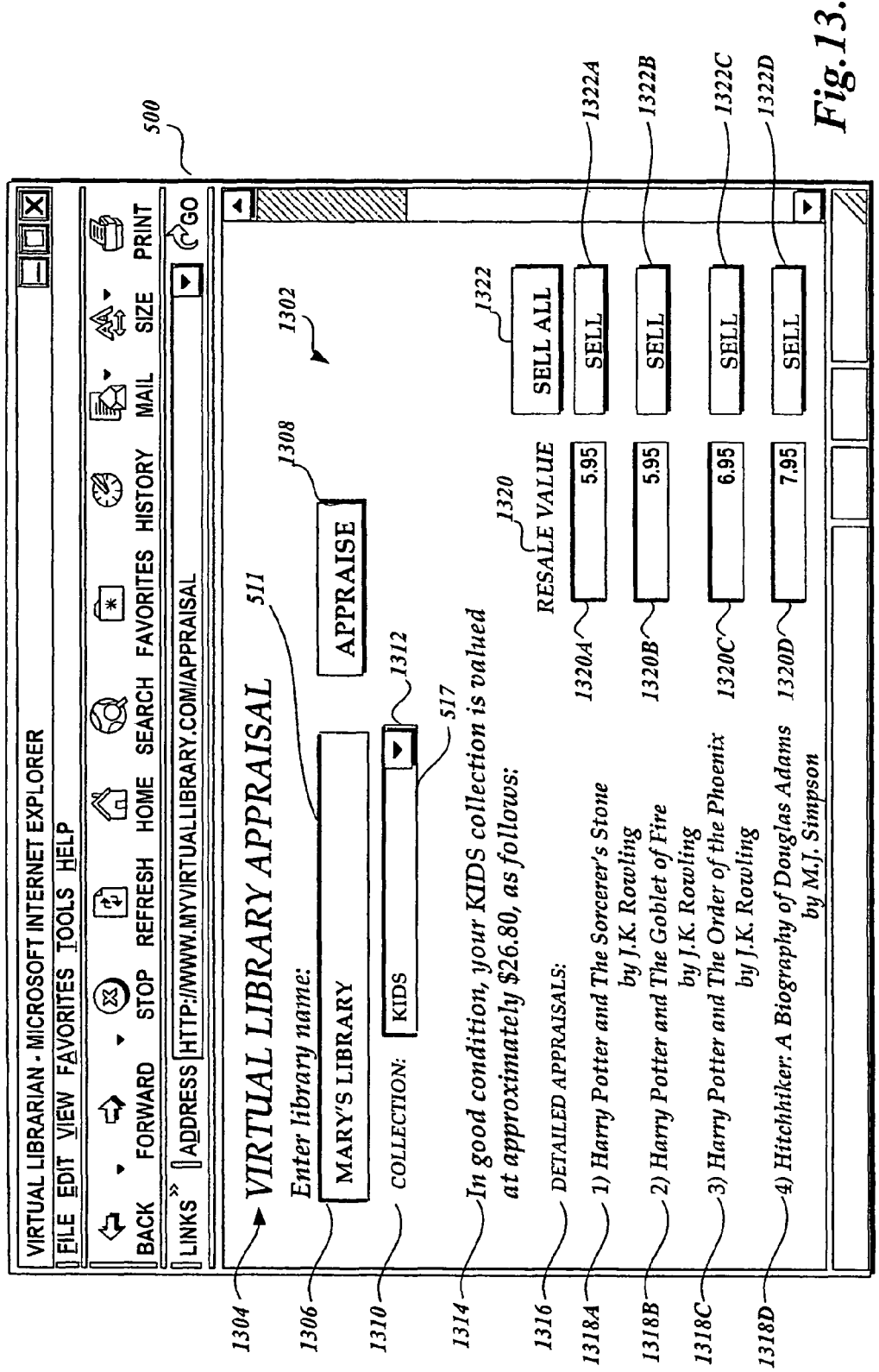
FIG. 13 depicts a browser program with an example Web page presenting a virtual librarian appraisal interface to a user in accordance with an embodiment of the invention.

As an example of the appraisal process, once the appraisal of the inventory has been computed or otherwise obtained, the virtual librarian process 400 causes the Web program 500 to display an appraisal interface, as illustrated in FIG. 13 at reference numeral 1302, entitled "VIRTUAL LIBRARY APPRAISAL," at reference numeral 1304. As shown, the name of the virtual library, "Mary's Library," for which the appraisal was obtained appears in a text box at reference numeral 1306 along with the name of the collection at reference numeral 1310, here selected as the "Kids" collection as appears in drop-down box at reference numeral 1312. The virtual library process 400 provides the user with a command button 1308 labeled "APPRAISE," which may be activated by the user if the name of the library and/or collection changes, to cause the virtual librarian process 400 to again obtain an updated appraisal for the same collection and library previously specified, or to compute or otherwise obtain an appraisal for a newly specified collection and library. The virtual librarian process 400 may obtain appraisals in various ways, including prompting the user to self-assess the condition of the book (or other product in question) and consulting a resale value database (not shown) to obtain resale values for the book in the assessed condition.

Returning again to FIG. 4C and FIG. 13, the virtual librarian process 400 prompts the user with the appraisal of the collection (or library) in the form of text appearing at reference numeral 1314, in this example "In good condition, your KIDS collection is valued at approximately $26.80, as follows." Along with the textual appraisal, the virtual library appraisal interface 1304 preferably includes a detailed appraisal of each item in the inventory associated with the library and/or collection. The detailed appraisal is in the form of a tabulated list entitled "Detailed Appraisals" at reference numeral 1316, with a column entitled "Resale Value," at reference numeral 1320, below which is listed each item along with its individual resale value, here including the titles "Harry Potter and the Sorcerer's Stone" valued at $5.95 at reference numerals 1318A and 1320A, "Harry Potter and the Goblet of Fire" valued at $5.95 at reference numerals 1318B and 1320B, "Harry Potter and the Order of the Phoenix," valued at $6.95 at reference numerals 1318C and 1320C, and "Hitchhiker: A Biography of Douglas Adams," valued at $7.95 at reference numeral 1318D and 1320D. The virtual library appraisal interface 1304 further includes command buttons labeled "SELL" for each individual book at reference numerals 1322A, 1322B, 1322C, and 1322D, respectively, and a command button labeled "SELL ALL" for all of the books at reference numeral 1322. When activated by the user, the virtual librarian process 400 transfers the user to another Web page (not illustrated) containing a seller interface in which the user may arrange to sell the contents of their virtual library by listing their books for sale on a merchant Web site.

Figure 4D:
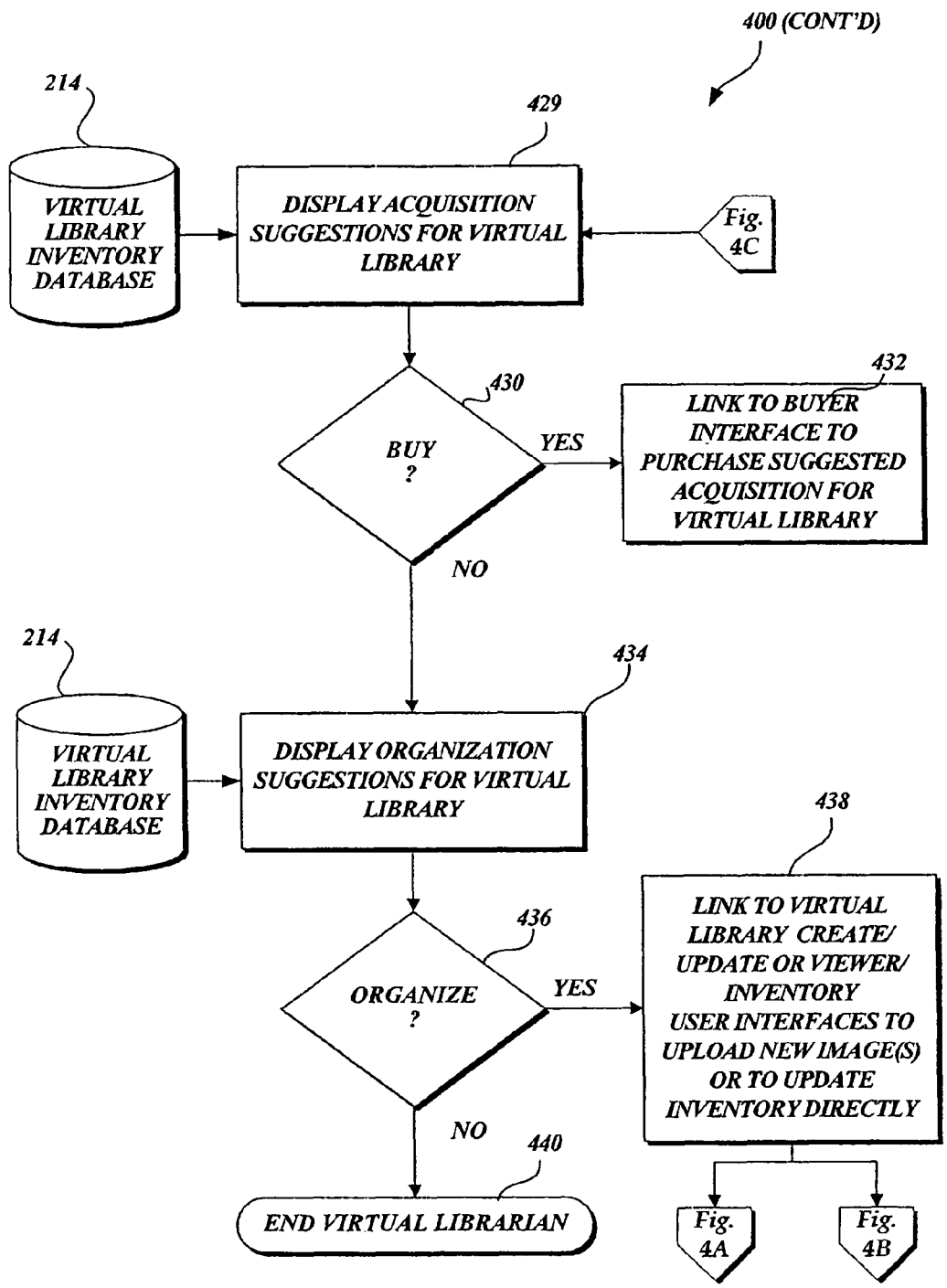

Referring now to FIG. 4D, if the user does not wish to sell any inventory, or has already arranged to do so, the virtual librarian process 400 continues at process block 429, to display an acquisition user interface to the user in response to a request for advice from the virtual librarian 400 regarding suggested acquisitions for a particular virtual library. The process 400 further continues at decision block 430 to determine whether the user wishes to buy the recommended titles, and, if so, branches to process block 432, where the user can link to a merchant interface to arrange to purchase the recommended titles online.

Figure 14:
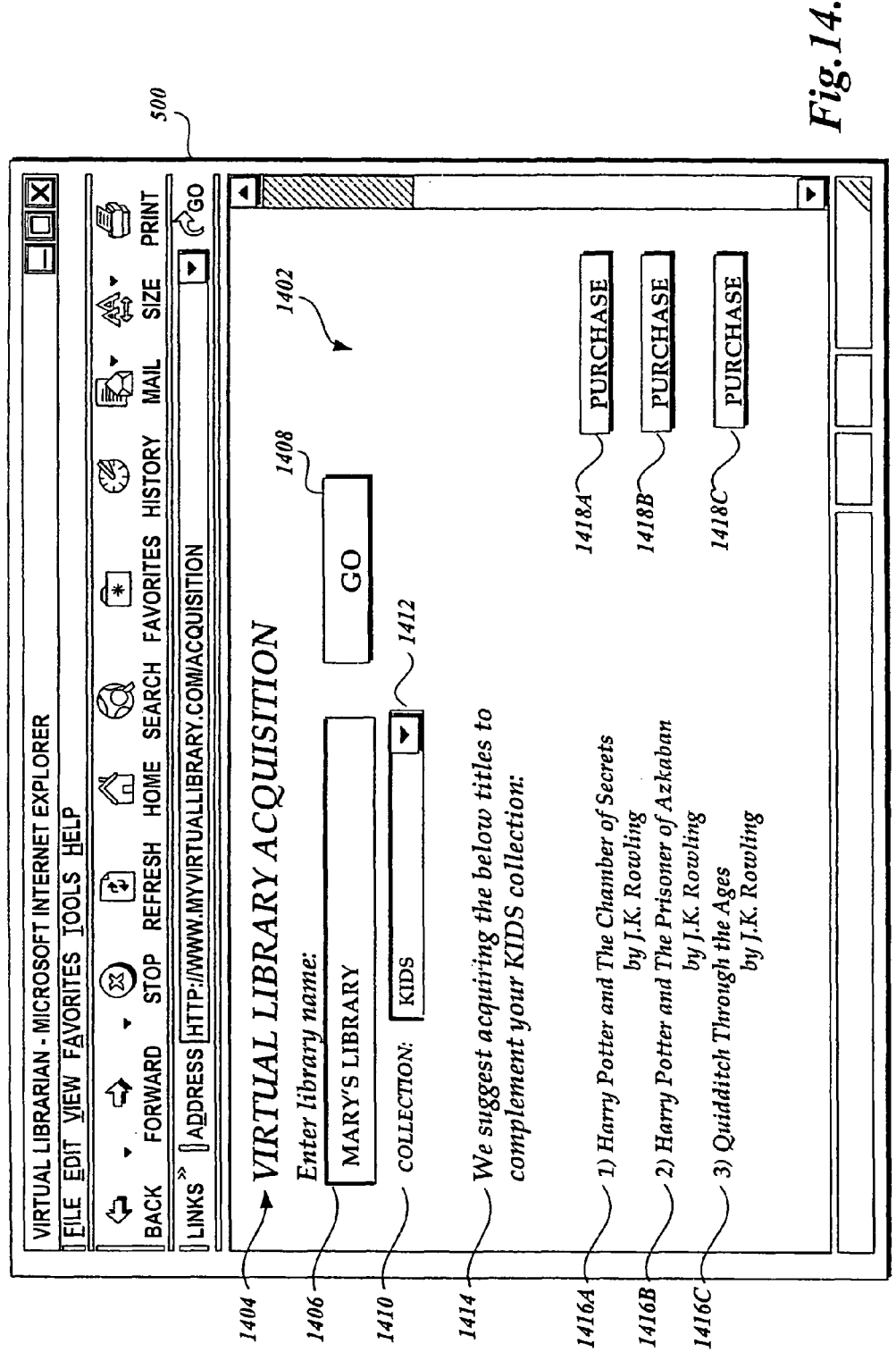
FIG. 14 depicts a browser program with an example Web page presenting a virtual librarian acquisition interface to a user in accordance with an embodiment of the invention.

In the illustrated acquisition interface in FIG. 14 at reference numeral 1402, entitled "Virtual Library Acquisition" at reference numeral 1404, the user has entered the name of the virtual library "Mary's Library" at reference numeral 1406 for which the user is seeking acquisition recommendations or suggestions. The user is optionally prompted to select the name of a particular collection at reference numeral 1410 within the virtual library for which acquisition recommendations are sought using a drop-down box at reference numeral 1412, here selecting the "Kids" collection. The virtual librarian process 400 prompts the user with the acquisition recommendations for the specified collection (or virtual library) in the form of text appearing at reference numeral 1414, in this example "We suggest acquiring the below titles to complement your KIDS collection."

In one embodiment, the virtual librarian process 400 generates the acquisition recommendations in consultation with an acquisition database (not shown), in which is stored predefined recommendations by genre, category, age group, etc. In one embodiment, the recommendations may be dynamically generated to complement historical data obtained from the virtual history database 212 for the user. Below the text 1414, the virtual library acquisition interface 1402 preferably includes a list of one or more items that the virtual librarian 300 recommends adding to the user's virtual library. In the illustrated example, the virtual library process 400 causes the Web browser program 500 to display three items, including "Harry Potter and The Chamber of Secrets," at reference numeral 1416A, "Harry Potter and The Prisoner of Azkaban," at reference numeral 1416B, and "Quidditch Through the Ages" at reference numeral 1416C. Along with the list of each book is displayed a command button labeled "PURCHASE" at reference numerals 1418A, 1418B, and 1418C, which, when activated by the user, cause the virtual librarian process 400 to transfer the user to another Web page (not illustrated) containing a merchant interface in which the user may arrange to purchase the recommended titles.

Returning now to FIG. 4D, if the user does not wish to buy any inventory or has already arranged to do so, the virtual librarian process 400 continues at process block 434, to display an organization user interface to the user in response to a request for advice from the virtual librarian 300 regarding suggestions for organizing a particular virtual library. The process 400 further continues at decision block 436 to determine whether the user wishes to organize their virtual library as suggested, and, if so, branches to process block 438, where the user is transferred to the virtual library creation and update interface illustrated at FIG. 6 so that the user can begin the process of uploading new images of their reorganized physical library. Alternatively, the user is transferred to the virtual library viewer and inventory interfaces at FIGS. 7-9 so that the user may update the inventory information directly to reflect the new organization.

Figure 15:
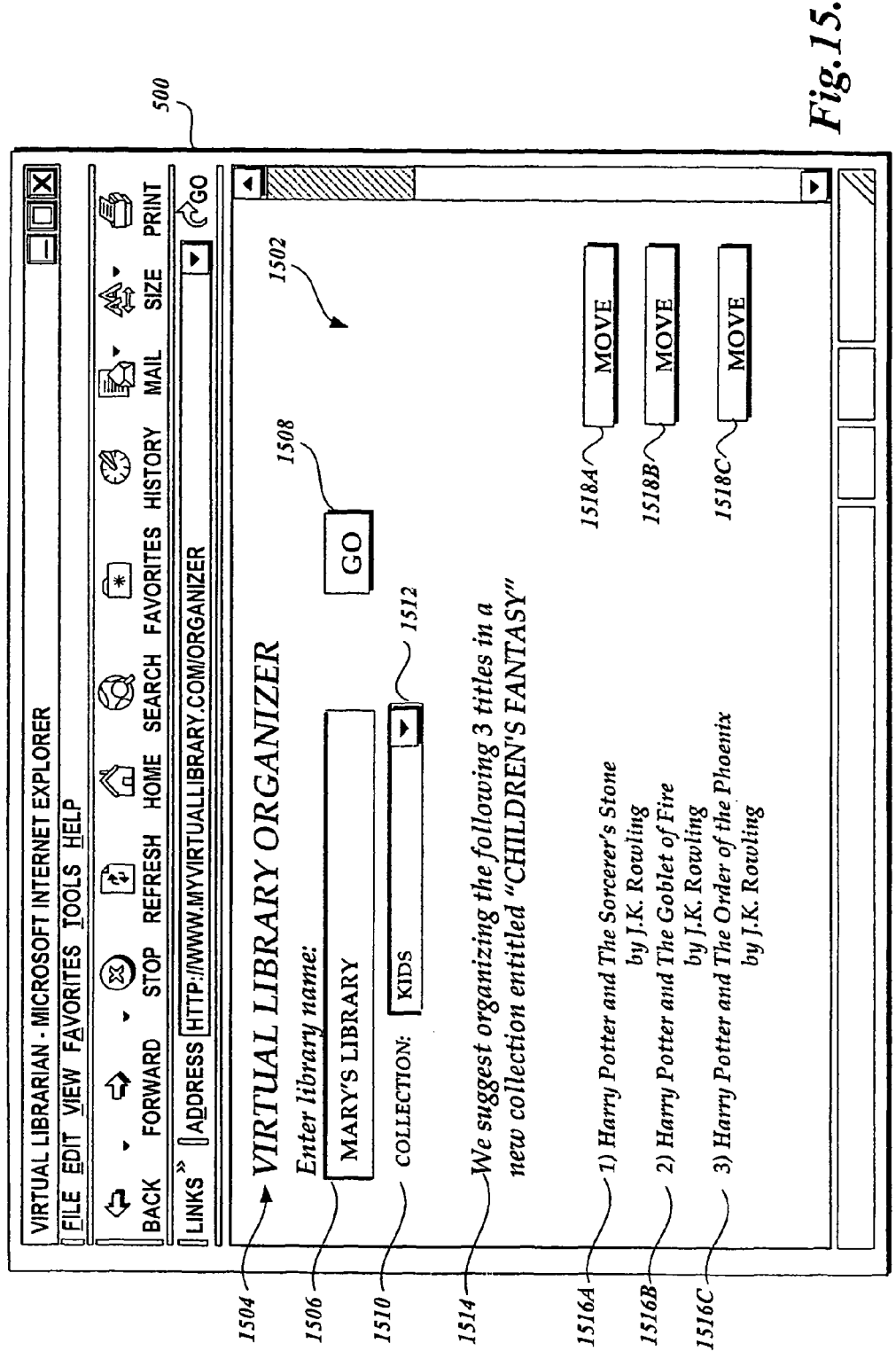
FIG. 15 depicts a browser program with an example Web page presenting a virtual librarian organizer interface to a user in accordance with an embodiment of the invention.

For example, in the illustrated organization interface in FIG. 15 at reference numeral 1502, entitled "Virtual Library Organizer" at reference numeral 1504, the user has entered the name of the virtual library "Mary's Library" at reference numeral 1506 for which the user is seeking organization advice. The user is optionally prompted to select the name of a particular collection at reference numeral 1510 within the virtual library for which organization advice is sought using a drop-down box at reference numeral 1512, here selecting the "Kids" collection. The virtual librarian process 400 prompts the user with organization advice for the specified collection (or virtual library) in the form of text appearing at reference numeral 1514, in this example "We suggest organizing the following 3 titles in a new collection entitled "CHILDREN'S FANTASY," below which the virtual library organization interface 1502 preferably includes a list of one or more items that the virtual librarian 300 recommends reorganizing to a different shelf or collection within the user's physical library, or to another physical library. In the illustrated example, the virtual library process 400 causes the Web browser program 500 to display three items, including "Harry Potter and the Sorcerer's Stone" at reference numeral 1516A, "Harry Potter and the Goblet of Fire" at reference numeral 1516B, and "Harry Potter and the Order of the Phoenix," at reference numeral 1516C. Along with the list of each book is displayed a command button labeled "MOVE" at reference numerals 1518A, 1518B, and 1518C, which, when activated by the user, cause the virtual librarian process 400 to automatically update the inventory using the generated suggestions displayed in the virtual library organizer interface 1502. Activating the "MOVE" buttons 1518A, 1518B, and 1518C may alternatively transfer the user to the virtual library create/update interface 602 illustrated in FIG. 6 so that the user may reorganize their home bookshelves according to the suggestions, and upload new images of the reorganized bookshelves. Alternatively, the process 400 may transfer the user to the virtual library viewer and inventory interfaces at reference numerals 702 and 802 in FIGS. 7 and 8, to allow the user the opportunity to update the inventory to reflect the suggested organization, which update may be performed manually.

It will be appreciated that describing the virtual librarian process 400 by reference to the flow diagrams in FIGS. 4A-4D enables one skilled in the art to develop computer-executable instructions to carry out the process on suitably configured computers. The flow diagrams do not, however, constrain the execution of such instructions to carry out the process in any particular order, nor do they require that every aspect of the virtual librarian process 400 described herein be carried out in every embodiment. In addition, the computer-executable instructions to carry out the process described in FIGS. 4A-4D may be written in a computer programming language or may be embodied in firmware logic. If written in a programming language conforming to a recognized standard, such instructions can be executed on a variety of hardware platforms and interface with a variety of operating systems.

It will be further appreciated that the present invention is not described with reference to any particular programming language, and it will be appreciated that a variety of programming languages may be used to implement the teachings of the invention as described. Furthermore, it is common in the art to speak of software, in one form or another (e.g., program, procedure, process, application . . . ), as taking an action or causing a result. Such expressions are merely a shorthand way of saying that execution of the software by a computer causes the processor of the computer to perform an action or a produce a result.

It will be further appreciated that the Web page interfaces described for the virtual librarian 300 with reference to FIGS. 5-15 are only illustrative and do not serve to limit the general application of the invention. For example, links as referenced herein may be embodied by the command buttons illustrated and described at reference numerals 512, 518, 614, 708, 808, 1008, 1108, 1208, 1308, 1322, 1418, and 1518, by hypertext links, or by other selectable connections that, when activated, will cause the virtual librarian process 400 to take the described action, such as transferring the user to another Web page interface, or generating an additional or updated display on the current Web page interface.

While embodiments of the invention have been illustrated and described above, it will be appreciated that various changes can be made therein without departing from scope of the claims that follow. For example, although the described embodiments refer primarily to implementations of the invention in the context of maintaining a physical library containing books, other implementations in the context of maintaining a physical library of music and videos, other media products, or other products capable of being inventoried are contemplated as being within the scope of the present invention.

What is claimed is:

1. A computer-implemented method that is executed on a computing device for creating a virtual library of products, the method comprising:

receiving, by a computing system having one or more computing devices, an image of one or more products as stored in a physical library;

generating, by the computing system, inventory information for at least one of the products from product identification information revealed in the image, the inventory information including at least a product identifier for a product; and storing, by the computing system, the inventory information in a virtual library.

2. The method of claim 1 further comprising, in response to a search request for a product:

searching the inventory information for a product whose product identifier is responsive to the search request; and causing the inventory information for the product to be displayed.

3. The method of claim 1 further comprising storing the image in the virtual library.

4. The method of claim 3 further comprising, in response to a search request for a product:

searching the inventory information for a product whose product identifier is responsive to the search request; and causing the corresponding image of the product to be displayed.

5. The method of claim 4 further comprising identifying a physical location of the product whose product identifier is responsive to the search request.

6. The method of claim 5, wherein identifying the physical location of the product comprises causing to be displayed, in relation to the displayed image, a graphical indicia of the physical location of the product.

7. The method of claim 5, wherein identifying the physical location of the product comprises emphasizing an appearance of the inventory information for the product displayed with the image.

8. The method of claim 5, wherein identifying the physical location of the product comprises displaying a textual description of the physical location.

9. The method of claim 4 further comprising identifying a geographic location of the product whose product identifier is responsive to the search request.

10. The method of claim 9, wherein identifying the geographic location of the product comprises causing to be displayed, in relation to the displayed image, a graphical indicia of the geographic location of the product.

11. The method of claim 9, wherein identifying the geographic location of the product comprises causing to be displayed a textual description of the geographic location of the product.

12. The method of claim 1, wherein generating inventory information for the product comprises applying recognition techniques to the image.

13. The method of claim 1, wherein generating inventory information for the product comprises recognizing a barcode for the product from the image and processing the barcode for the product identification information.

14. The method of claim 1, wherein generating inventory information for the product comprises comparing the image to one or more reference images for which inventory information is known.

15. The method of claim 1, wherein generating inventory information for the product comprises providing at least a portion of the image to another party and receiving inventory information from the other party.

16. The method of claim 1, wherein generating inventory information for the product comprises receiving inventory information from a user.

17. The method of claim 1, wherein the inventory information for the product is further generated based on historical information related to a user.

18. The method of claim 17, wherein the historical information comprises purchase history information.

19. The method of claim 1, wherein the inventory information for the product is further generated based on a portion of the product information.

20. The method of claim 1, wherein the product identification information comprises a title of the product.

21. The method of claim 1, wherein the product identification information comprises an author of the product.

22. The method of claim 1 further comprising receiving an updated image of one or more products as stored in the physical library.

23. The method of claim 1 further comprising generating a substitute image for one or more products.

24. The method of claim 1 further comprising receiving updated inventory information for one or more products as stored in the physical library.

25. The method of claim 1 further comprising making the virtual library available to another user.

26. The method of claim 25, wherein making the virtual library available to another user comprises generating a pointer to the virtual library.

27. The method of claim 25, wherein making the virtual library available to another user comprises:
generating an object to contain the virtual library; and
transmitting the virtual library object to said other user.

28. The method of claim 1 further comprising generating an appraisal of the monetary value of a product in the virtual library.

29. The method of claim 28, wherein generating the appraisal comprises obtaining a resale value for the product.

30. The method of claim 28 further comprising facilitating an offer to sell at least one of the appraised products.

31. The method of claim 1 further comprising identifying at least one suggestion for acquisition of one or more products to complement the virtual library.

32. The method of claim 31 further comprising facilitating purchase of the suggested product.

33. The method of claim 1 further comprising identifying at least one suggestion for reorganizing the virtual library.

34. The method of claim 33, wherein the product reorganization suggestion includes a suggestion to move a product from a collection with which the product is associated to another collection.

35. The method of claim 1 further comprising identifying at least one suggestion for reorganizing said physical library.

36. The method of claim 35, wherein the product reorganization suggestion includes a suggestion to move a product from a collection with which the product is associated to another collection.

37. The method of claim 35, wherein the product reorganization suggestion includes a suggestion to move a product from said physical library to another physical library.

38. A system for maintaining a virtual library of products, the system comprising:
an image database containing images of the products as they are stored in a physical library;
an inventory database containing inventory information for the products depicted in the images, wherein the inventory information is generated from product identification information revealed in the images; and
a computing device configured to enable a user to retrieve inventory information of a desired product from said inventory database.

39. The system of claim 38, wherein the computing device is further configured to display the inventory information for the desired product.

40. The system of claim 38, wherein the computing device is further configured to enable a user to retrieve an image of the desired product from said image database.

41. The system of claim 40, wherein the computing device is further configured to display the image of the desired product.

42. The system of claim 41, wherein the computing device is further configured to identify a physical location of the product whose image and inventory information has been retrieved.

43. The system of claim 42, wherein the computing device is configured to identify the physical location of the product by displaying, in relation to the displayed image, a graphical indicia of the physical location of the product.

44. The system of claim 42, wherein the computing device is configured to identify the physical location of the product by emphasizing an appearance of the inventory information for the product displayed with the image.

45. The system of claim 42, wherein the computing device is configured to identify the physical location of the product by displaying a textual description of the physical location.

46. The system of claim 41, wherein the computing device is further configured to identify a geographic location of the product whose image and inventory information has been retrieved.

47. The system of claim 46, wherein the computing device is configured to identify the geographic location of the product by displaying, in relation to the displayed image, a graphical indicia of the geographic location of the product.

48. The system of claim 46, wherein the computing device is configured to identify the geographic location of the product by displaying a textual description of the geographic location of the product.

49. The system of claim 38, wherein the computing device is further configured to enable the user to associate in a collection, products depicted in one or more of the images stored in the images database.

50. The system of claim 38, wherein the computing device is configured to generate inventory information for a product by applying recognition techniques to an image of the product stored in the images database.

51. The system of claim 38, wherein the computing device is configured to generate inventory information for a product by recognizing a barcode for the product from an image of the product stored in the images database and processing the barcode for product identification information.

52. The system of claim 38, wherein the computing device is configured to generate inventory information for a product by comparing an image of the product to one or more reference images for which inventory information is obtainable.

53. The system of claim 38, wherein the computing device is configured to generate inventory information for a product by providing at least a portion of the image to another party and receiving inventory information from the other party.

54. The system of claim 38, wherein the computing device is configured to generate inventory information for a product using product identification information received from a user.

55. The system of claim 38, wherein the computing device is configured to generate inventory information for a product based on historical information related to a user.

56. The system of claim 55, wherein the historical information comprises purchase history information.

57. The system of claim 38, wherein the computing device is configured to generate inventory information for a product based on a portion of the product information for the product.

58. The system of claim 38, wherein the product identification information comprises a title of the product.

59. The system of claim 38, wherein the product identification information comprises an author of the product.

60. A computing apparatus, comprising:
a memory unit; and
a processor unit configured to execute instructions stored in the memory unit, wherein the instructions cause the processor unit to:
store in an image database an image of one or more products as stored in a physical library;
generate inventory information for the products from product identification information revealed in the stored image, the inventory information including a product identifier and a product location of each stored product; and
store the inventory information in a virtual library.

61. The computing apparatus of claim 60, wherein the processor unit is configured, in response to a search request for a product, to:
search the inventory information for a product whose product identifier is responsive to the search request; and
display the inventory information for the product.

62. The computing apparatus of claim 60, wherein the processor unit is configured, in response to a search request for a product, to:
search the inventory information for a product whose product identifier is responsive to the search request; and
cause the image of the product to be displayed.

63. The computing apparatus of claim 62, wherein the processor unit is configured to cause display of the product location of the product in relation to the displayed image.

64. The computing apparatus of claim 63, wherein the product location of the product is a physical location of the product relative to other products depicted in the same image.

65. The computing apparatus of claim 63, wherein the product location of the product is an absolute physical location of the product depicted in the image.

66. The computing apparatus of claim 63, wherein the product location of the product is a geographic location of the product.

67. The computing apparatus of claim 60, wherein the processor unit is configured to make the virtual library available to another user.

68. The computing apparatus of claim 60, wherein the processor unit is further configured to appraise a resale value of the virtual library.

69. The computing apparatus of claim 68, wherein the appraised resale value of the virtual library includes an appraised resale value of each product in the virtual library.

70. The computing apparatus of claim 60, wherein the processor unit is configured to recommend products for acquisition to complement the virtual library.

71. The computing apparatus of claim 60, wherein the processor unit is configured to recommend reorganization of products within the virtual library.

72. The computing apparatus of claim 60, wherein processor unit is configured to recommend reorganization of products within the physical library.

73. The computing apparatus of claim 60, wherein the processor unit is configured to recommend reorganization of products between two or more physical libraries.

74. The computing apparatus of claim 60, wherein the processor unit is configured to identify one or more subsets of the virtual library.

75. The computing apparatus of claim 74, wherein the processor unit is configured to cause display of the inventory information for products belonging to a requested subset of the virtual library.

76. The computing apparatus of claim 74, wherein the processor unit is configured to cause display of an image of products belonging to a requested subset of the virtual library.

* * * * *